US010545870B2

(12) United States Patent
Ishii

(10) Patent No.: US 10,545,870 B2
(45) Date of Patent: Jan. 28, 2020

(54) ARITHMETIC PROCESSING DEVICE AND ARITHMETIC PROCESSING DEVICE CONTROL METHOD

(71) Applicant: FUJITSU LIMITED, Kawasaki-shi, Kanagawa (JP)

(72) Inventor: Hiroyuki Ishii, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 582 days.

(21) Appl. No.: 15/193,164

(22) Filed: Jun. 27, 2016

(65) Prior Publication Data
US 2017/0024329 A1 Jan. 26, 2017

(30) Foreign Application Priority Data
Jul. 22, 2015 (JP) .................................. 2015-144509

(51) Int. Cl.
*G06F 12/12* (2016.01)
*G06F 12/0811* (2016.01)
*G06F 12/126* (2016.01)

(52) U.S. Cl.
CPC ........ *G06F 12/0811* (2013.01); *G06F 12/126* (2013.01); *G06F 2212/62* (2013.01)

(58) Field of Classification Search
None
See application file for complete search history.

(56) References Cited

U.S. PATENT DOCUMENTS

| 9,021,206 B2* | 4/2015 | Flemming ........... G06F 12/0888 711/122 |
| 2006/0155934 A1* | 7/2006 | Rajamony ........... G06F 12/0804 711/134 |
| 2007/0094450 A1* | 4/2007 | VanderWiel .......... G06F 12/126 711/133 |
| 2007/0233966 A1* | 10/2007 | Chinthanmani .... G06F 12/0831 711/146 |
| 2008/0040555 A1* | 2/2008 | Iyer ..................... G06F 12/0811 711/133 |
| 2008/0147986 A1* | 6/2008 | Chinthamani ........ G06F 12/082 711/141 |
| 2009/0164730 A1* | 6/2009 | Harikumar ........... G06F 12/084 711/129 |
| 2009/0164731 A1* | 6/2009 | Le ....................... G06F 12/0831 711/130 |

(Continued)

FOREIGN PATENT DOCUMENTS

JP H08-137749 5/1996

*Primary Examiner* — Ryan Bertram
*Assistant Examiner* — Alex G Olson
(74) *Attorney, Agent, or Firm* — Fujitsu Patent Center

(57) ABSTRACT

An arithmetic processing device includes clusters, each including cores and a last level cache shared by the cores; a home agent connected to the last level caches; and a memory controller connected to the home agent to control accesses to a memory. In response to a memory request from a first last level cache in a first cluster, the home agent issues a first replace request to the first last level cache to evict a first victim line in the first last level cache, the home agent issues a second replace request to a second last level cache in a second cluster in an idle state other than the first cluster to evict a second victim line in the second last level cache, and the second last level cache fills data of the first victim line to the second victim line.

7 Claims, 21 Drawing Sheets

(56) References Cited

U.S. PATENT DOCUMENTS

| | | | | |
|---|---|---|---|---|
| 2009/0164735 A1* | 6/2009 | Nicholas | ............ | G06F 12/0811 |
| | | | | 711/141 |
| 2010/0268887 A1* | 10/2010 | Ghai | .................. | G06F 12/0811 |
| | | | | 711/125 |
| 2010/0306458 A1* | 12/2010 | Aho | ........................ | G11C 7/10 |
| | | | | 711/105 |
| 2011/0107031 A1* | 5/2011 | Anand | .................. | G06F 12/084 |
| | | | | 711/122 |
| 2011/0191542 A1* | 8/2011 | Vash | ....................... | G06F 12/08 |
| | | | | 711/130 |
| 2012/0047333 A1* | 2/2012 | Kottapalli | ........... | G06F 12/0822 |
| | | | | 711/146 |
| 2014/0173207 A1* | 6/2014 | Wang | .................. | G06F 12/0811 |
| | | | | 711/122 |
| 2014/0181394 A1* | 6/2014 | Hum | .................. | G06F 12/0824 |
| | | | | 711/108 |
| 2015/0026406 A1* | 1/2015 | McLellan | ........... | G06F 12/0864 |
| | | | | 711/128 |
| 2016/0203083 A1* | 7/2016 | Park | .................... | G06F 12/0806 |
| | | | | 711/122 |

\* cited by examiner

FIG.8

| SYMBOL | NAME | FUNCTION |
|---|---|---|
| MEM-RQ | MEMORY REQUEST | LLC REQUESTS HA TO RETURN MEMORY DATA |
| MEM-CPLT | DATA RESPONSE | DATA RESPONSE TO MEMORY REQUEST |
| RPL-OD | REPLACE ORDER | ORDER IN WHICH HA REQUESTS LLC TO REMOVE SPECIFIC CACHE LINE |
| RPL-CPLT | REPLACE RESPONSE | RESPONSE TO REPLACE ORDER, WHICH ACCOMPANIES DATA OF REPLACED CACHE LINE, AND IN WHICH DIRTY DATA IS WRITTEN BACK TO MEMORY |
| RPL-TR-OD | TRANSFER-AND-REPLACE ORDER | ORDER IN WHICH HA REQUESTS LLC TO REMOVE SPECIFIC CACHE LINE AND TO TRANSFER THE CACHE LINE TO SPECIFIC LLC |
| RPL-TR-CPLT | TRANSFER-AND-REPLACE RESPONSE | RESPONSE TO TRANSFER-AND-REPLACE ORDER, WHICH ACCOMPANIES DATA OF REPLACED AND TRANSFERRED CACHE LINE |
| LN-ALC-OD | LINE ALLOCATION ORDER | ORDER IN WHICH HA REQUESTS LLC TO ALLOCATE BUFFER OF LINE FILL BUFFER |
| LN-ALC-CPLT | LINE ALLOCATION RESPONSE | RESPONSE TO BUFFER ALLOCATION ORDER, WHICH INVOLVES NOTIFICATION OF ACK/NACK, WAY, CLUSTER NUMBER, AND LFB NUMBER |
| FET-RQ-OD | FETCH REQUEST ISSUE ORDER | ORDER IN WHICH HA REQUESTS LLC TO ISSUE FETCH REQUEST |
| FET-RQ-CPLT | RESPONSE TO FETCH REQUEST ISSUE ORDER | RESPONSE INDICATING WHETHER FETCH REQUEST HAS BEEN ISSUED OR NOT |

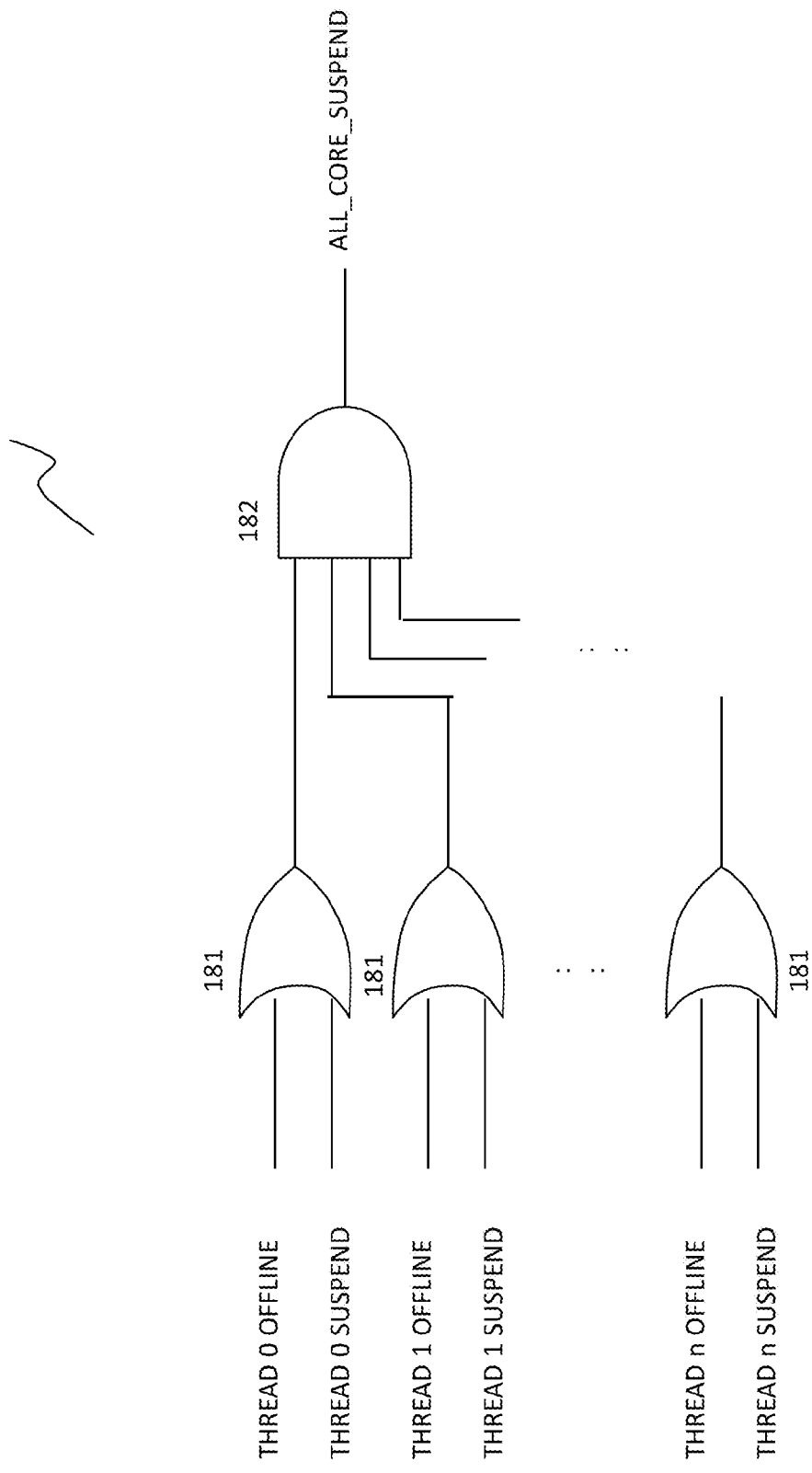

ARITHMETIC PROCESSING DEVICE AND ARITHMETIC PROCESSING DEVICE CONTROL METHOD

CROSS-REFERENCE TO RELATED APPLICATION

This application is based upon and claims the benefit of priority of the prior Japanese Patent Application No. 2015-144509, filed on Jul. 22, 2015, the entire contents of which are incorporated herein by reference.

FIELD

The present invention relates to an arithmetic processing device, and an arithmetic processing device control method.

BACKGROUND

An arithmetic processing device (a central processing unit (CPU) or a processor) includes a plurality of cores, a last level cache (LLC) shared by the plurality of cores, and a memory controller. The hierarchy of a cache memory includes a level-1 cache (L1 cache) provided inside a core and a level-2 cache (L2 cache) provided outside the core and shared by a plurality of cores, for example. In this case, the L2 cache corresponds to the LLC. Alternatively, when the hierarchy of a cache memory includes an L1 cache and an L2 cache provided inside a core and a level-3 cache (L3 cache) provided outside the core and shared by a plurality of cores, the L3 cache corresponds to the LLC.

In any hierarchy structure, when a cache miss occurs in an LLC, the LLC issues a fetch request to a memory controller, and the memory controller accesses a main memory to read data and returns a data response to the LLC. The LLC registers (fills) the read data in a cache and returns the data response to a core.

The cache capacity tends to increase. That is, with miniaturization in processes, the number of cores integrated to a chip increases. Moreover, with an increase in the number of cores (threads), the associativity (the number of ways) of a set-associative cache also increases. As a result, the capacity of an LLC shared by a plurality of cores also increases. Thus, the chip size of high-end processor chips tends to increase with improvement in performance regardless of a reduction in the area resulting from miniaturization.

In view of such circumstance, when a processor having many cores employs an LLC configuration in which all cores can equally access the LLC, a data access path to the LLC is lengthened due to a large chip size and the large-capacity LLC and the hit delay of the LLC increases.

Thus, instead of a single LLC configuration in which an LLC is shared by all cores, a configuration in which an LLC is divided to a plurality of LLCs and each of a plurality of core groups shares the divided LLCs has been proposed. In such a configuration, the LLCs shared by each core group have a small capacity, a physical distance from a core in the core group to each LLC is small, and the control is simple. Thus, high-speed access can be realized. That is, the LLC hit latency in a configuration including a plurality of clusters in which a limited number of cores share a small-capacity LLC is smaller than that in the large-capacity, single-LLC configuration in which the LLC can be accessed equally from all cores. In this configuration, when the data of the cache memory is less shared between clusters, the LLC exhibits the maximum performance.

Japanese Laid-open Patent Publication No. H8-137749 discloses a technique of dynamically changing the cache capacity allocated to multiprocessors.

SUMMARY

However, when an LLC is divided, some problems occur. For example, it is difficult to increase the capacity of a cache that can be used by an application program executed by each core, beyond the capacity of the divided LLC. In general, it is not allowed for a certain core to register a new cache line to an LLC in a cluster other than a cluster to which the core belongs. Thus, the capacity of an LLC when seen from a certain thread is limited to the capacity of a divided LLC.

Further, in the configuration in which an LLC is divided, when all cores in a cluster enter to a suspend or inactive state, the LLC in the cluster is not used effectively. On the other hand, in the configuration in which all cores share a single LLC, even when some cores are suspended or inactive, the remaining active cores can use the entire LLC. Thus, a problem that some LLCs are not used effectively does not occur.

Moreover, in the case of a processor in which each core obtains the right to activate software and the number of cores to be activated can be changed, when all cores in a cluster enter to an inactive state, the LLC in the cluster is not used at all.

According to an aspect of the embodiments, an arithmetic processing device includes: a plurality of clusters, each including a plurality of cores and a last level cache shared by the plurality of cores, each core having an arithmetic unit; a home agent connected to the last level cache included in each of the plurality of clusters; and a memory controller connected to the home agent to control accesses to memory, wherein in response to a memory request supplied from a first last level cache in a first cluster among the plurality of clusters, the home agent issues a first replace request to the first last level cache to cause the first last level cache to evict a first victim line in the first last level cache, the home agent issues a second replace request to a second last level cache in a second cluster in an idle state other than the first cluster to cause the second last level cache to evict a second victim line in the second last level cache, and the second last level cache fills data of the first victim line to the second victim line.

According to one aspect, it is possible to effectively use divided LLCs.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a table of main requests and orders.

FIG. 9 is a diagram illustrating a configuration of a suspend detection circuit.

DESCRIPTION OF EMBODIMENTS

Figure 1:
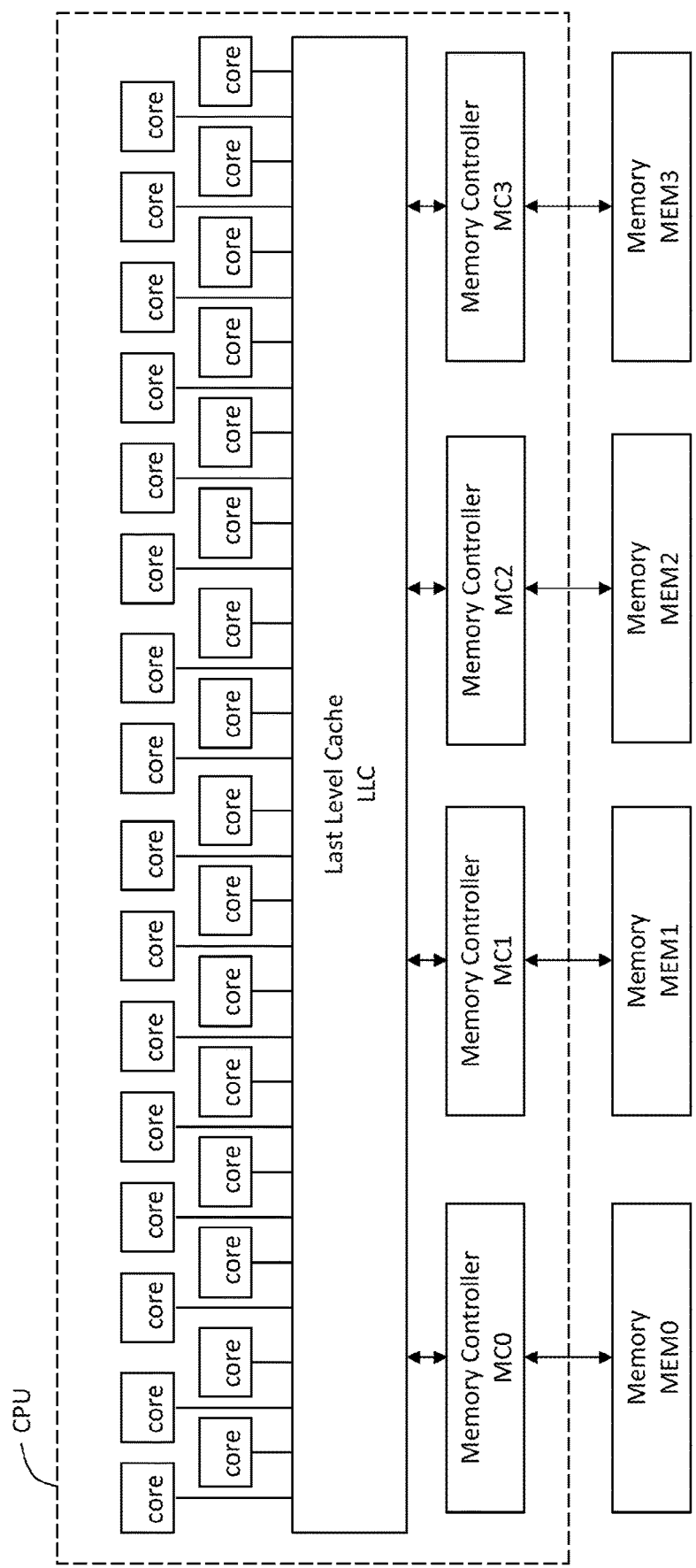
FIG. 1 is a diagram illustrating a configuration of an arithmetic processing device (CPU, processor) in which all cores share a single LLC

FIG. 1 is a diagram illustrating a configuration of an arithmetic processing device (CPU, processor) in which all cores share a single LLC. In the processor CPU in FIG. 1, 24 cores Core share a single LLC. Four memory controllers MC0 to MC3 are connected to the LLC, and the respective memory controllers MC0 to MC3 control memory access to corresponding memories MEM0 to MEM3, respectively.

A core includes an instruction decoder (not illustrated), an arithmetic unit (not illustrated) that performs an arithmetic operation based on decoded instructions, and a first level cache (L1 instruction cache and L1 data cache), for example. The core issues a memory request to the L1 data cache in response to an instruction to read data in the memory and issues a memory request to the LLC when a cache miss occurs in the L1 data cache.

The LLC searches cache tags in response to the memory request from the core and returns a data response to the core when a cache hit occurs. On the other hand, when a cache miss occurs, the LLC outputs a fetch request to any one of the memory controllers MC0 to MC3 to cause the memory controller to access an external main memory MEM0-MEM3 to read data. Moreover, the memory controller sends a data response to the LLC and also returns the data response to the core.

When the chip size of the processor CPU increases and the LLC has a larger capacity, the following problem may occur. For example, when a left-end core Core outputs a memory request, a cache hit occurs in the LLC, and the data read from a right-end cache memory in the LLC is returned, the hit latency increases.

Figure 2:
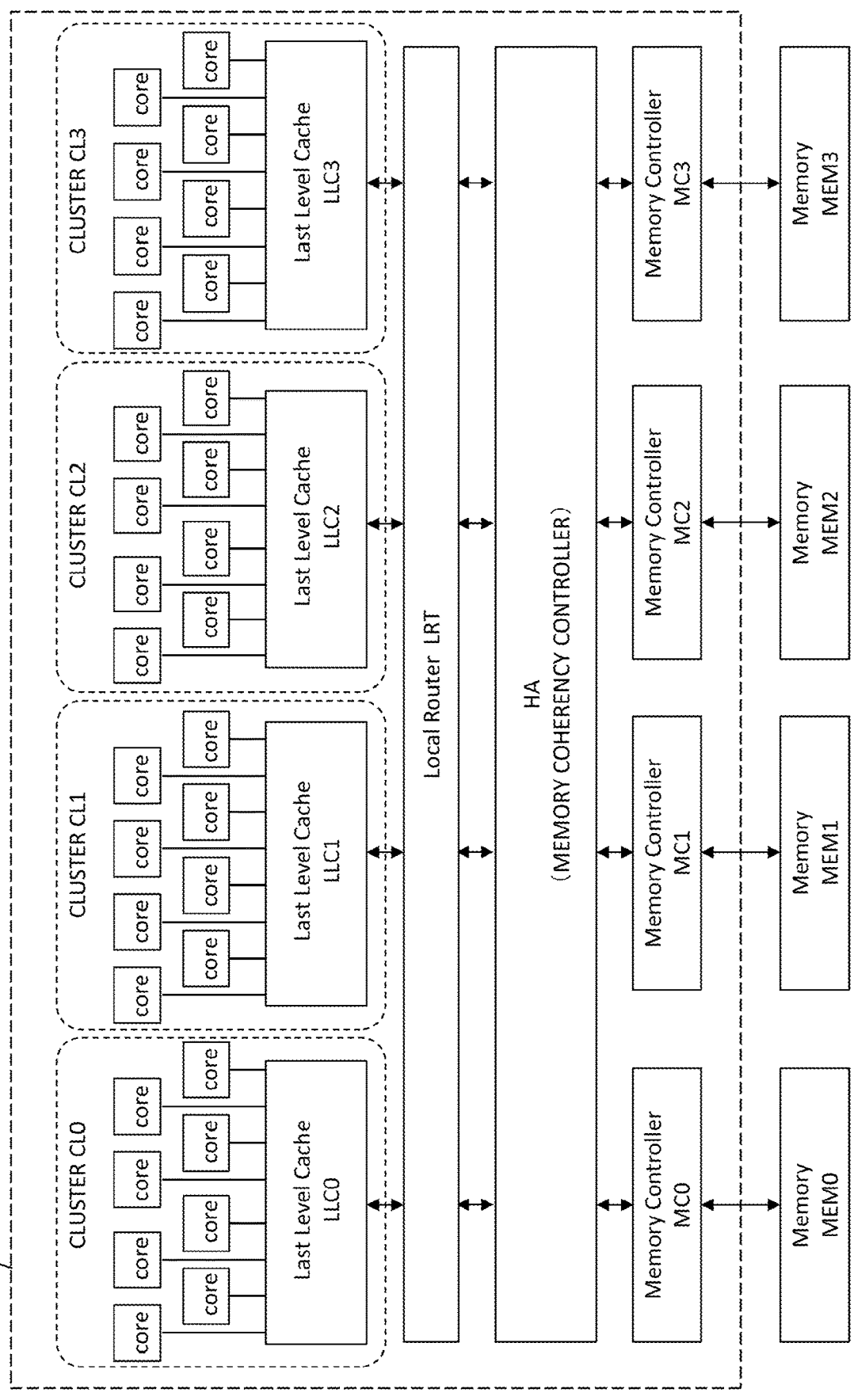
FIG. 2 is a diagram illustrating a configuration of an arithmetic processing device according to the present embodiment.

[Arithmetic Processing Device According to Embodiment] FIG. 2 is a diagram illustrating a configuration of an arithmetic processing device according to the present embodiment. In the processor CPU in FIG. 2, 32 cores Core are divided to four groups (Clusters) each including eight cores, and the eight cores in each core group share a single LLC. That is, the processor in FIG. 2 includes eight cores Core and four clusters CL0 to CL3 each including a single LLC.

Further, the processor includes a local router LRT that transfers data or the like between four clusters CL0 to CL3 and a home agent HA. The home agent HA performs memory coherency control or the like to ensure coherency of memory data between the four clusters, for example. The configuration and the operation of the home agent will be described in detail later. The home agent HA is connected to the memory controllers MC0 to MC3 and accesses the external memory amounts MEM0 to MEM3 connected to a processor chip. Although only one memory controller may be provided, when a plurality of memory controllers is used, the throughput of accesses to the main memory is increased.

As illustrated in FIG. 2, in the processor of the present embodiment, an LLC is divided to a plurality of LLCs (for example, four LLCs), a plurality of cores is similarly grouped to a plurality of core groups (for example, four groups), and each of the divided core groups shares a single LLC. Thus, the latency when a memory request from a core results in a cache hit in the LLC decreases.

Figure 3:
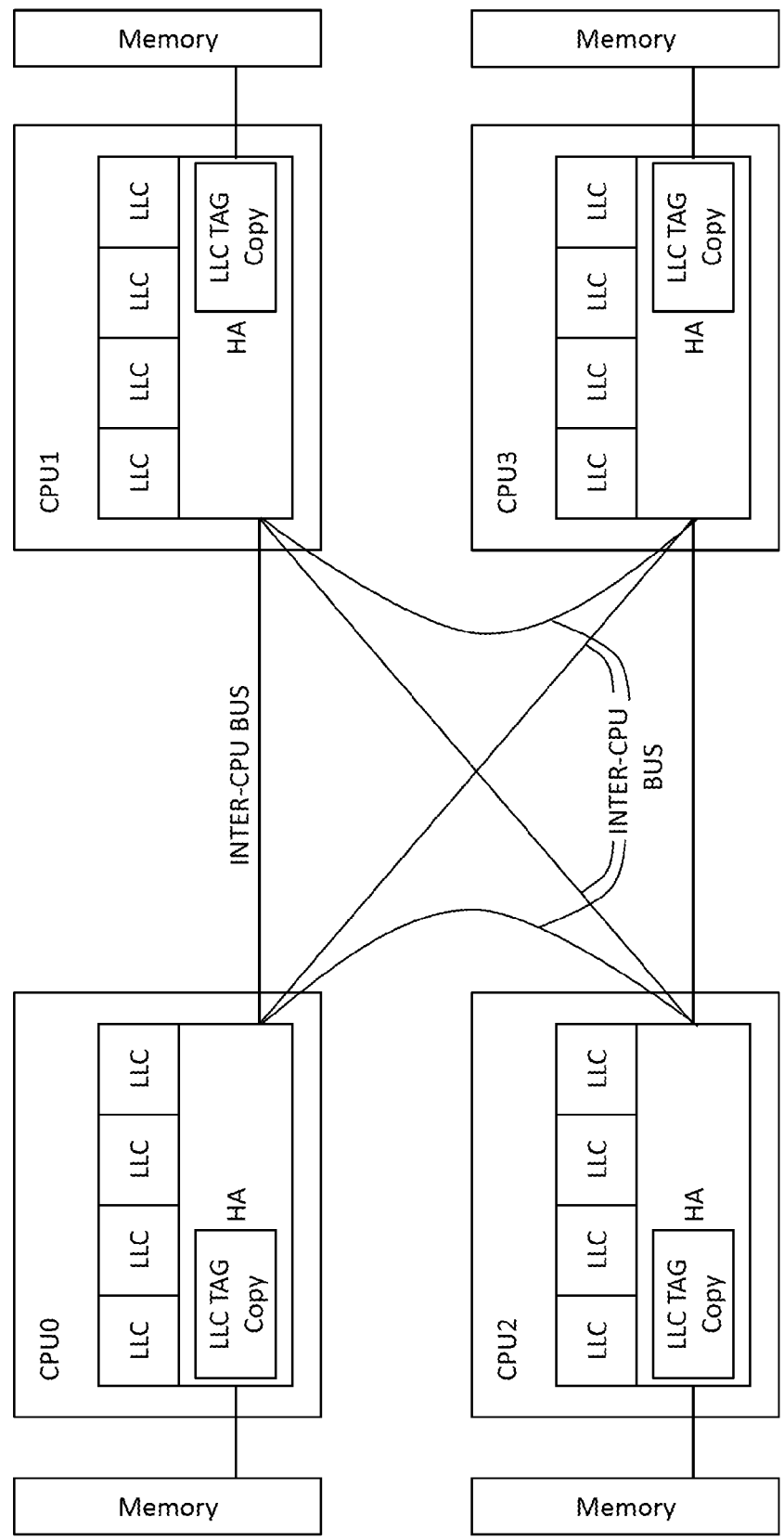
FIG. 3 is a diagram illustrating a configuration between a plurality of arithmetic processing devices (processor chips).

FIG. 3 is a diagram illustrating a configuration between a plurality of arithmetic processing devices (CPUs or processor chips). In FIG. 3, four processor chips CPU0 to CPU3 are connected by inter-CPU buses. Specifically, the inter-CPU buses are connected via an interconnect circuit (not illustrated) included in or attached to the home agent HA in each processor chip. Due to this, the home agent HA of each of the four processor chips CPU0 to CPU3 transfers data to home agents of other processor chips.

An address of a memory request from a core may be in a local memory managed by the processor of the core that issued the memory request and may be in a remote memory managed by another processor CPU. To cope with memory requests of various addresses, the home agent HA controls the coherency of an entire system and maintains the copies of LLC tags to obviate the need of snooping to the LLC so that the bus traffic in the processor chip is reduced. In particular, the home agent HA is one of configurations effective in large-scale system based on many-core processors.

Hereinafter, for better understanding, a request from the LLC to the home agent HA will be referred to as a request and a request from the home agent to the LLC will be referred to as an order. Both the request and the order are requests that request a counterpart to perform a certain process, and only the directions of the request and the order are reversed. In the claims, the request and the order are not distinguished but both will be referred to as a request.

Figure 4:
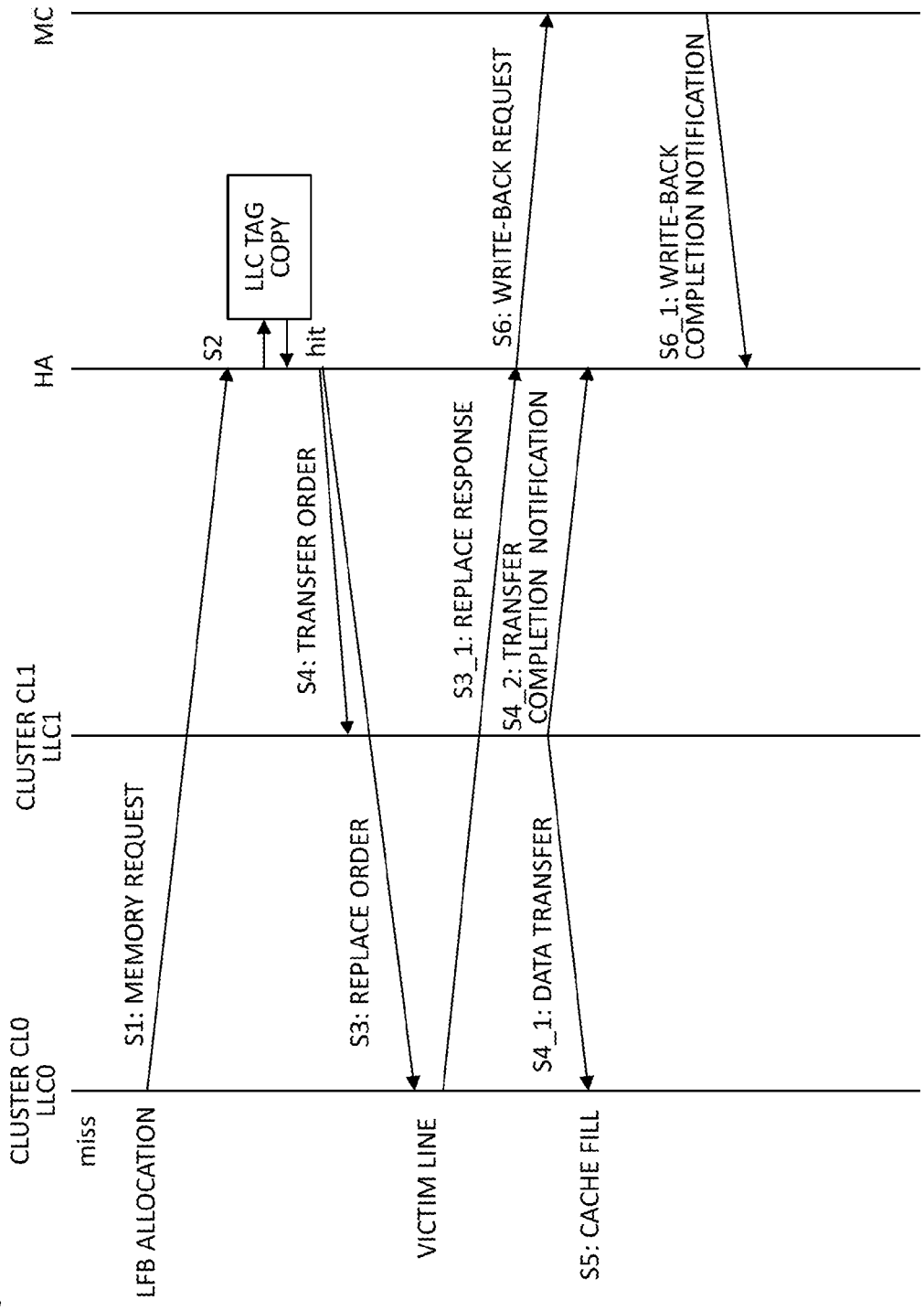
FIG. 4 is a diagram illustrating an example of a cache copy-back operation of the home agent.

[Cache Copy-Back] FIG. 4 is a diagram illustrating an example of a cache copy-back operation of the home agent. The home agent HA is a pipeline control circuit provided outside the cache memory hierarchy, and a main operation thereof is to control the coherency between a plurality of divided LLCs. Thus, the home agent HA maintains the copies of cache tags of all LLCs, receives a memory request which results in a cache miss in an LLC, and examines whether another LLC in the chip holds data (or instruction codes) by referring to the LLC tag copies. The home agent HA transfers data between LLCs when the LLC holding the data is present and issues a memory request (fetch request) to the memory when the LLC holding the data is not present.

Specifically, the home agent performs operations as illustrated in FIG. 4. In the example of FIG. 4, as a premise, it is assumed that a processor chip includes two clusters CL0 and CL1, a core (not illustrated) in the cluster CL0 issues a memory request to LLC0, and a cache miss occurs in the LLC0 of the cluster CL0. In response to this, the LLC0 of the cluster CL0 issues a memory request to the home agent HA (S1). In this time, the LLC0 allocates a line fill buffer. The line fill buffer is a buffer that temporarily stores received request data, and the data stored in this buffer is filled to a cache line (or a victim line) in the LLC0.

In response to the memory request S1, the home agent searches the copies of cache tags of all clusters CL0 and CL1 and a cache hit occurs with the tag of the LLC1 of the cluster CL1 (S2).

Thus, the home agent issues a replace order to the LLC0 of the cluster CL0 (S3) to cause the LLC0 to evict (remove) the victim line. That is, the home agent specifies an eviction target cache line in the LLC0 by referring the LLC tag copies and issues the replace order S3 to the LLC0 so as to cause the LLC0 to write back the data of the cache line to the memory. In response to this, the LLC0 sends a replace response to the replace order S3 to the home agent together with the data of the eviction target victim line (S3_1), and the home agent issues a write-back request for the evicted data to the memory controller MC (S6) to cause the memory controller MC to write the data back to the memory. After that, the home agent receives a write-back completion notification from the memory controller MC (S6_1).

On the other hand, the home agent issues a transfer order (S4) to the LLC1 of the cluster CL1 as well as issuing the replace order S3. That is, the home agent issues a transfer order to the LLC1 to instruct the LLC1 to transfer the hit data of the cache line of the LLC1 to the LLC0. In response to this, the LLC1 transfers the hit data to the LLC0 (S4_1) and the LLC0 fills the transferred data in the cache memory thereof (S5). As a result, the LLC0 and LLC1 of both clusters share the same data.

Figure 5:
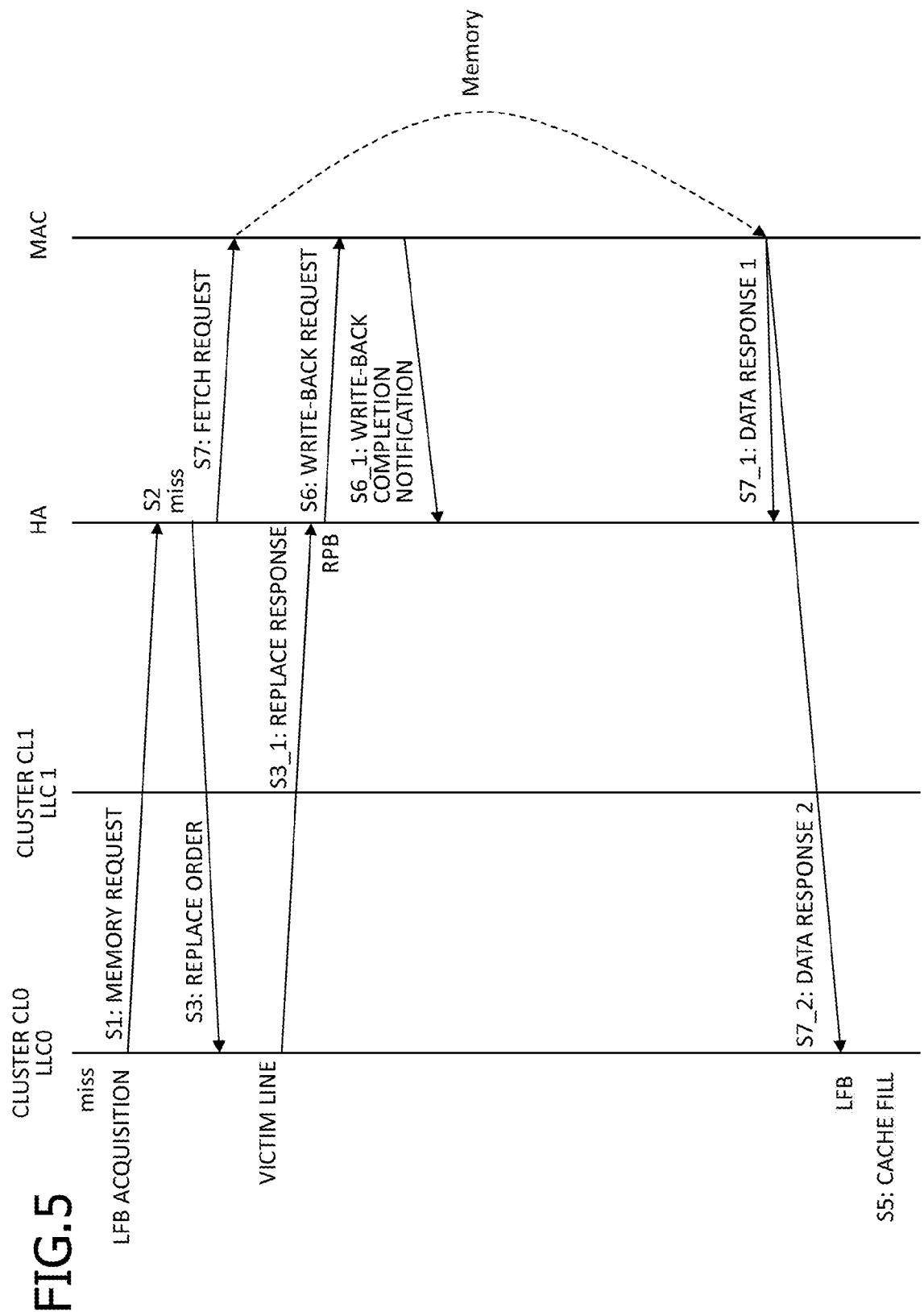
FIG. 5 is a diagram illustrating an example of the operation of a memory request after a cache miss occurs in an LLC.

[Example in which LLC Utilization Efficiency Decreases] FIG. 5 is a diagram illustrating an example of the operation of a memory request after a cache miss occurs in an LLC. As a premise, it is assumed that a core (not illustrated) in the cluster CL0 issues a memory request to the LLC0, a cache miss occurs in the LLC0 of the cluster CL0, and the LLC0 issues a fetch request to a main memory and fills data in a response to the fetch request in the cache memory. Moreover, it is assumed that the cluster CL1 is in an idle state and all cores in the cluster CL1 are in an inactive or suspend state.

Similarly to FIG. 4, the LLC0 of the cluster CL0 issues a memory request to the home agent HA (S1). In response to this, the home agent HA searches LLC tag copies and a cache miss occurs (S2). As a result, the home agent HA issues a replace order to the LLC0 (S3) and issues a fetch request to the memory controller (S7).

In response to the replace order S3, the LLC0 sends a replace response with the evicted data of a designated victim line to the home agent (S3_1). Moreover, the home agent HA issues a write-back request to the memory controller MC (S6).

Subsequently, the memory controller MC sends a data response to the fetch request S7 to the home agent and the LLC0 (S7_1 and S7_2). In response to this, the LLC0 fills the data of the data response in the cache memory (S5)

In a general memory request illustrated in FIG. 5, although the cluster CL1 is in an idle state and the LLC1 in the cluster CL1 is not use, the data of the victim line in the LLC0 that issued the memory request is written back to an external memory. Due to this, when the LLC0 of the cluster CL0 issues a memory request for the data of the replaced victim line later, the requested data has to be acquired by issuing a fetch request to the memory.

Such a situation is an example of a situation in which the entire capacity of the LLC is not effectively used when the LLC is divided to a plurality of LLCs. In the present embodiment, in order to suppress such a decrease in the LLC utilization efficiency, the home agent HA performs control so that the data of a replace target victim line of the LLC0 is filled to the LLC1 in the cluster CL1 in the idle state.

Figure 6:
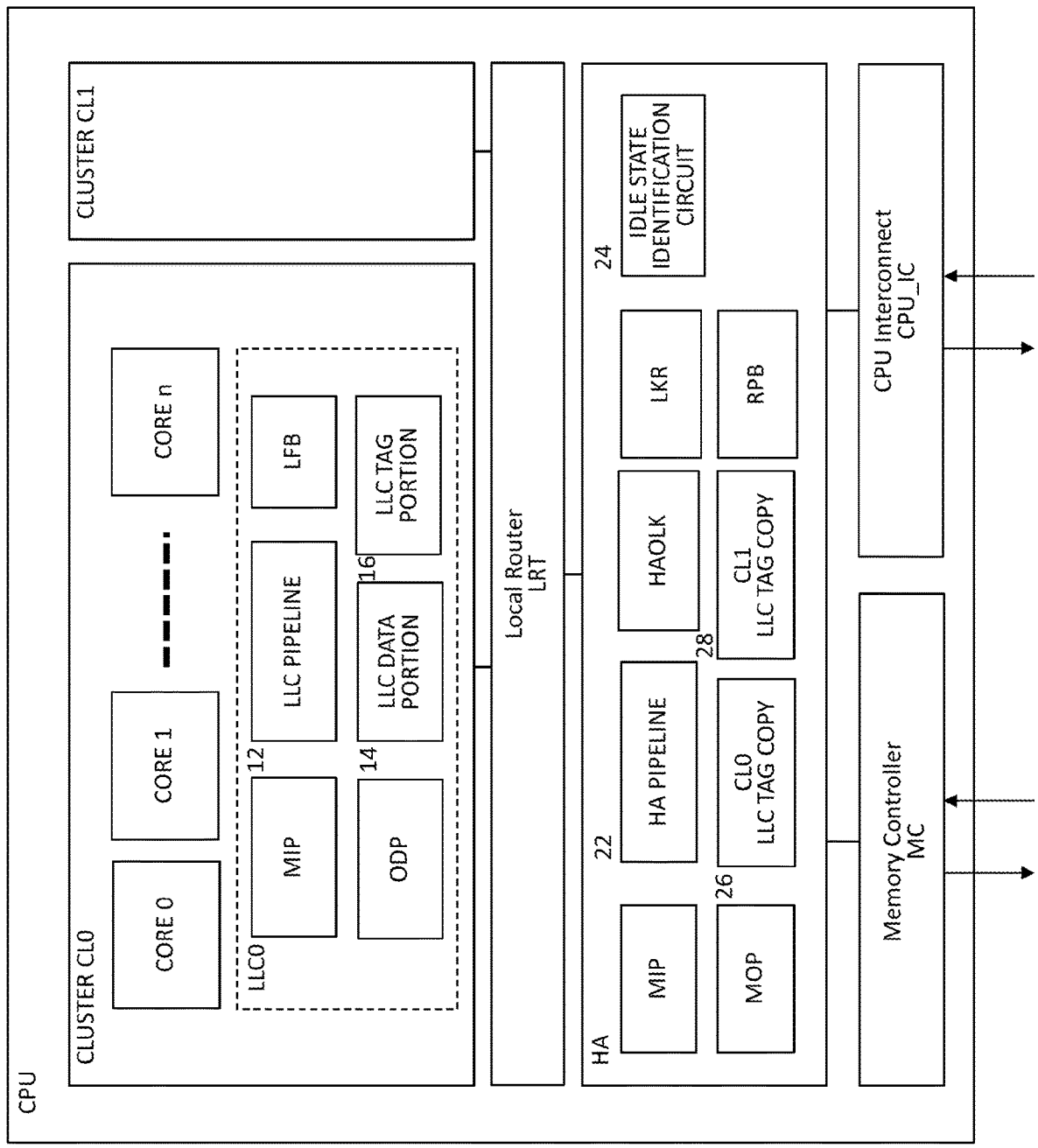
FIG. 6 is a diagram illustrating a configuration example of the processor CPU according to the present embodiment.

[Configuration of LLC and HA] FIG. 6 is a diagram illustrating a configuration example of the processor CPU according to the present embodiment. In the example of FIG. 6, for better understanding, it is assumed that the processor CPU has two clusters CL0 and CL1. The cluster CL0 includes a plurality of cores CORE0 to COREn and a single LLC0 shared by these cores. The cluster CL1 has the same configuration as the cluster CL0.

The LLC0 includes a move-in port MIP that mainly receives requests from cores and an order port ODP that mainly receives orders from the home agent. Further, the LLC0 includes a LLC pipeline 12, a LLC data portion 16, a LLC tag portion 14, and a line fill buffer LFB.

The LLC pipeline 12 searches cache tags corresponding to an address of a memory request from a core and performs cache hit determination. When a cache hit occurs, the LLC pipeline 12 sends a data response to the core. When a cache miss occurs, the LLC pipeline 12 issues a memory request to the home agent. The LLC data portion 16 is a cache data memory of the LLC and the LLC tag portion 14 is a cache tag memory.

The line fill buffer LFB is a fill data buffer that temporarily stores data supplied from the main memory, another LLC1, and the HA of another CPU before the data is written to the cache memory when the LLC0 has issued a memory request. The data stored in this data buffer is filled to a cache line. The line fill buffer LFB is sometimes referred to as a move-in buffer. The LLC1 has the same configuration as the LLC0.

The local router LRT is an on-chip network that connects the clusters CL0 and CL1 to the home agent HA.

On the other hand, the home agent HA includes a move-in port MIP that mainly receives requests from LLCs and a move-out port MOP that mainly receives order responses from LLCs. Further, the home agent HA includes a HA pipeline 22 and tag copies 26 and 28 of all LLCs of the clusters.

The HA pipeline 22 searches the LLC tag copies based on an address of the memory request issued from the LLC0 of the cluster CL0 and checks whether the LLC1 of another cluster CL1 has a requested cache line, for example. Moreover, the HA pipeline 22 controls a cache line transferring between clusters, issues a write-back request to an external memory, a fetch request or a store request to memory, and a request to another processor according to a tag state. Further, the HA pipeline 22 records appropriate state transitions in the LLC tag copies in order to control the cache coherency within a processor chip or the cache coherency of an entire system having a plurality of processor chips. Examples of the state transition include MESI control states (Modified, Exclusive, Share, Invalid). The LLC tag copies 26 and 28 maintain the addresses, the valid bits, and the states of cache lines of LLCs of all clusters.

The home agent HA has two lock circuits. Firstly, a lock register LKR issues a fetch request to memory when the data corresponding to the address requested in the memory request issued from an LLC is not present in any LLC. Further, the lock register locks all request target addresses so that a request is not issued to the same addresses.

Secondly, a HA order lock circuit HAOLK locks the address of an order when the home agent HA issues the order to an LLC so that a redundant order is not issued to the same address.

A replace buffer RPB is a buffer in which, when a cache miss occurs in an LLC in response to a memory request and the LLC registers new data, the data of a victim line removed (evicted) from the LLC in place of a cache line in which the new data is filled is temporarily stored when the data is written back to memory. Specifically, the data of the replace response to a replace order that the home agent HA has issued to the LLC is temporarily stored in the replace buffer RPB. Moreover, the data temporarily stored in the replace buffer RPB is written back to the memory via the memory controller MC.

A CPU interconnect circuit CPU-IC is a circuit for connecting to another processor chip CPU via the inter-CPU bus that connects the processor chips CPUs. Further, the home agent includes an idle state identification circuit 24 that identifies whether the clusters CL0 and CL1 are in an idle state.

Figure 7:
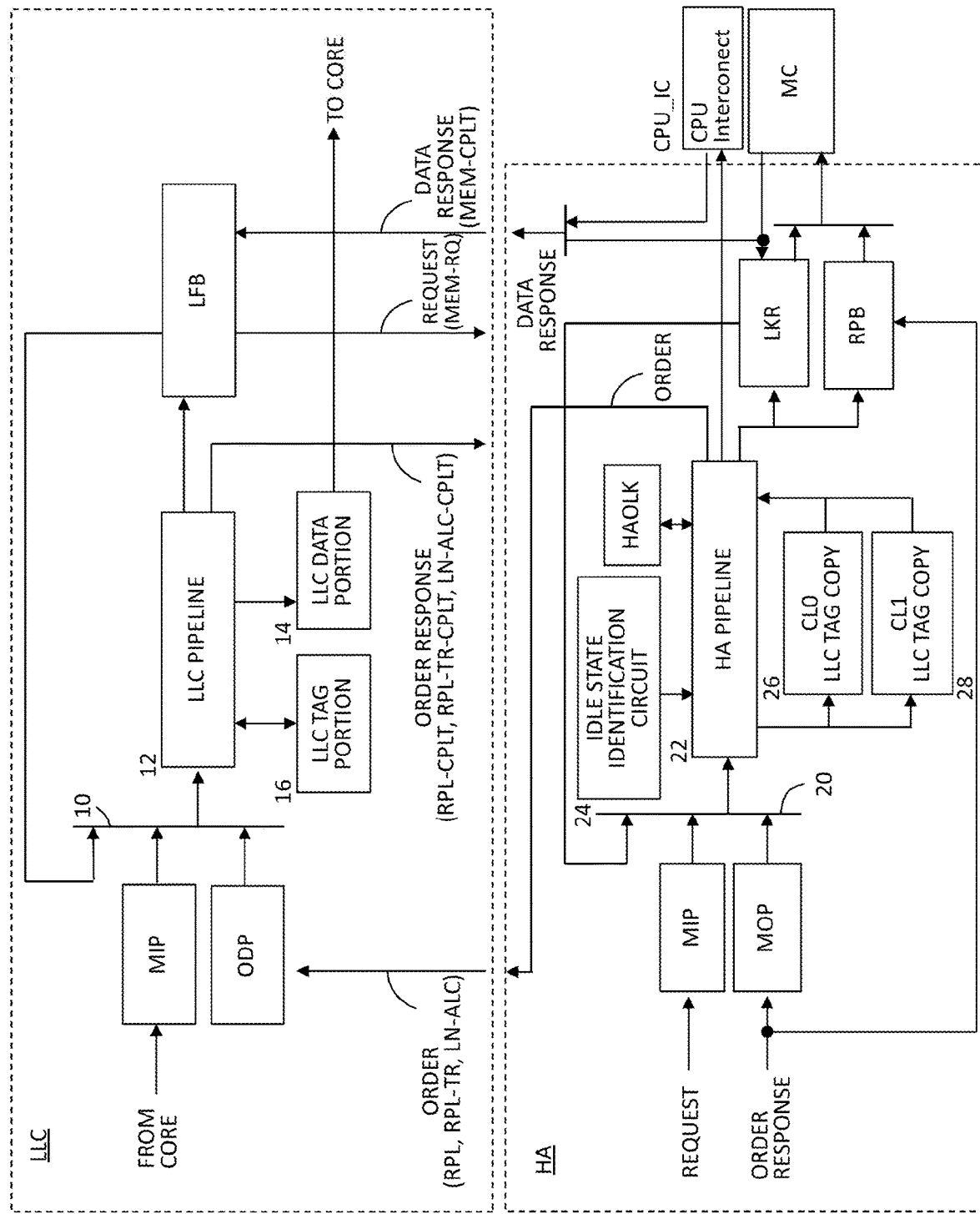
FIG. 7 is a diagram illustrating a specific configuration example of the LLC and the HA.

FIG. 7 is a diagram illustrating a specific configuration example of the LLC and the HA. As described above, the LLC issues a request to the home agent HA and the home agent HA returns a response to the request to the LLC. Conversely, the home agent HA issues an order to the LLC and the LLC returns a response to the order to the home agent HA. In order to clarify these relationships, FIG. 7 illustrates the configurations of the LLC and the home agent HA in parallel. In FIG. 7, the local router LRT that connects the LLC and the HA is not depicted.

The LLC includes a select circuit 10 that selects a request or an order received by the move-in port MIP and the order port ODP according to a predetermined priority and submits (inputs) the selected request or order to the LLC pipeline 12. The select circuit 10 also select the data response that is input to the line fill buffer LFB and inputs the data response to the LLC pipeline 12.

For example, in response to a submitted memory request from a core, the LLC pipeline 12 searches the LLC tag portion 14 based on the address of the memory request and checks whether a cache hit occurs. When a cache hit occurs, the LLC pipeline 12 extracts data in the LLC data portion 16 and sends a data response to the core. Moreover, when a cache miss occurs, the LLC pipeline 12 allocates a buffer in the line fill buffer LFB to the address of the memory request and issues a memory request MEM-REQ to the home agent HA.

The data responses to the memory request are sent from an LLC of another cluster, the memory (the memory controller MC), and the memory or the cache of another processor CPU, and these data responses are sent to the line fill buffer LFB via the home agent HA. Upon receiving the data response, the line fill buffer LFB temporarily stores data in an allocated line fill buffer LFB corresponding to the address of the memory request and submits a request to fill (register) the data in a cache to the LLC pipeline 12. The LLC pipeline 12 returns a data response to a core that requested the data while filling the data in the LLC tag portion 14 and the LLC data portion 16.

The order port ODP receives the order issued by the home agent HA and the select circuit 10 input the received order to the LLC pipeline 12. Moreover, the LLC pipeline 12 processes the order and sends an order response to the home agent HA.

The orders issued from the home agent HA include a replace order RPL-OD. The replace order is an order that requests removal (eviction) of a victim line in the LLC according to the memory request. Moreover, in the present embodiment, the orders issued by the home agent HA include a transfer-and-replace order RPL-TR-OD. The transfer-and-replace order is an order added in the present embodiment and is an order that requests eviction of a victim line in the LLC and transfer of the victim line to an LLC of another cluster in an idle state.

Further, the orders added to the present embodiment include a line allocation order LN-ALC-OD that requests an LLC in a cluster in the idle state to allocate a line fill buffer LFB for transferring a victim line. The orders added to the present embodiment also include a fetch request issue order FET-RQ-OD that requests an LLC in a cluster in the idle state to issue a fetch request to memory.

As described above, the LLC pipeline 12 is a control circuit that processes request or order signals to issue a new request and send a response to the order. The LLC tag portion 14 is a cache tag memory of an LLC and the LLC data portion 16 is a cache data memory of an LLC. Moreover, the line fill buffer LFB is a fill data storage buffer that temporarily stores the fill data of the data response before the data is written to the cache memory and includes a number of buffers for storing a plurality of cache lines.

On the other hand, the home agent HA includes a select circuit 20 that selects a request or an order response based on a predetermined priority among the requests received by the move-in port MIP or the order responses received by the move-out port MOP and submits (inputs) the selected request or order response to the HA pipeline 22.

A memory request based on a cache miss in the LLC is received by the move-in port MIP in the home agent HA. The move-in port MIP is provided in a number corresponding to the number of clusters and the select circuit 20 inputs (submits) the received memory requests to the HA pipeline 22.

The HA pipeline 22 searches the LLC tag copies 26, 28 in response to the submitted memory request and issues a transfer order to transfer data to a cache-hit LLC when a cache hit occurs with the LLC tag copy of another cluster as illustrated in FIG. 4. Further, the HA pipeline 22 issues a replace order to the cache-missed LLC to remove (evict) the victim line. Moreover, when there is a possibility that the victim line is dirty data, the HA pipeline 22 acquires a replace buffer RPB in order to write the dirty data back to memory. The replace response from the cache-missed LLC flows from the move-out port MOP to the HA pipeline 22, and the dirty data is transferred to the replace buffer RPB and is written back to memory via the memory controller MC.

When a cache miss occurs with the LLC tag copies of another cluster, the HA pipeline 22 issues a fetch request to the memory of its own processor or the memory of another CPU according to the address of the memory request. When the address is the memory of its own processor, the HA pipeline 22 acquires the lock of the lock register LKR and issues a fetch request to the memory controller via the lock register LKR. When the address is in the memory of the other CPU, the HA pipeline 22 issues a fetch request via the CPU interconnect circuit CPU-IC to the other CPU. The response data from its own memory or a remote CPU is transferred to the line fill buffer LFB of a request source cluster via the home agent. When a cache miss occurs with the LLC tag copies of the other cluster, the HA pipeline 22 also issues a replace order to the cache-missed LLC to remove (evict) the victim line.

The idle state identification circuit 24 in the home agent HA monitors the idle state of all clusters to acquire information indicating which cluster is in the idle state. In response to a memory request issued as a result of a cache miss in an LLC, the HA pipeline 22 issues a replace order to the cache-missed LLC to remove (evict) the victim line and issues a replace order to the LLC of a cluster in the idle state to remove (evict) a cache line in which the victim line is filled. Further, the HA pipeline 22 issues a line allocation order to the LLC of the cluster in the idle state to allocate a line fill buffer and issues various orders so that the data of the victim line is transferred to the LLC of the cluster in the idle state. As a result, the LLC of the cluster in the idle state fills the transferred data of the victim line to the removed cache line.

As a result, the LLC of the cluster in the idle state is effectively utilized, and when a memory request is issued again for the data of the victim line, the HA pipeline 22 issues a transfer order to the LLC of the cluster in the idle state so that the data saved in the LLC of the cluster in the idle state is transferred to the source LLC of the memory request and transfers the data in the same way as illustrated in FIG. 4.

The HA pipeline 22 processes the request issued from the LLC and issues a needed order to the LLC. The issued order is received by the order port ODP of the LLC and is submitted (input) to the LLC pipeline 12 by the select circuit 10. Moreover, the order response sent from the LLC pipeline 12 of the LLC is received by the move-out port MOP in the HA and is submitted to the HA pipeline 22.

[Main Request and Order] FIG. 8 is a table of main requests and orders. The requests and orders will be described briefly below.

The memory request MEM-RQ is issued to the home agent HA when a cache miss occurs in an LLC to request the data of memory. The data response MEM-CPLT is a data response that the home agent HA sends to the LLC in response to a memory request.

The replace order RPL-OD is an order that the home agent HA issues to the LLC to request the LLC to remove (evict) a specific cache line. The replace response RPL-CPLT is a response to the replace order, and when the data of the replace response is dirty, the home agent HA writes the data back to the memory.

The transfer-and-replace order RPL-TR-OD is an order that the home agent HA issues to the LLC to request the LLC to remove (evict) a specific cache line and transfer the cache line to a specific LLC. The transfer-and-replace response RPL-TR-CPLT is a response to the transfer-and-replace order and is accompanied by the data of the cache line removed and transferred.

The line allocation order LN-ALC-OD is an order that the home agent HA issues to the LLC to request allocation of a buffer of the line fill buffer. The line allocation response LN-ALC-CPLT is a response to the line allocation order and notifies ACK/NACK, an allocated way, a cluster number, an LFB number (line fill buffer number).

The fetch request issue order FET-RQ-OD is an order that the home agent HA requests the LLC to issue a fetch request. The fetch request issue order response FET-RQ-CPLT is a response to the fetch request issue order.

Although not illustrated in FIG. 8, the transfer order described in FIG. 4 is one of the orders that the home agent HA issues to the LLC.

[Idle State Identification Circuit] In the present embodiment, the home agent HA performs control so that the data of a replace target victim line of the LLC0 is filled to the LLC1 in the cluster CL1 in the idle state. Thus, the home agent HA includes the idle state identification circuit 24 that identifies which cluster is in the idle state. Hereinafter, the idle state identification circuit 24 will be described.

FIG. 9 is a diagram illustrating a configuration of a suspend detection circuit. A suspend detection circuit 18 is provided in each cluster, for example. Alternatively, the suspend detection circuit 18 may be provided in each cluster in the home agent HA.

The suspend detection circuit 18 outputs an all-core suspend signal ALL_CORE_SUSPEND indicating that all cores in a cluster are in a suspend state when all threads belonging to the cluster are offline or suspended. The suspend detection circuit 18 includes an OR gate 181 that takes logical OR between offline signals and suspend signals of each thread in the cluster and an AND gate 182 that takes logical AND between the outputs of the OR gates 181 of all threads.

Suspend is the status to which a CPU transitions in response to a suspend instruction executed when a task that an OS waits for execution disappears. Offline is the statue of a core that is not activated (inactive) due to an inactivation state in a core license or the status of a core which is in a state of being invalid as a hardware configuration. Any of the statuses is a state in which the LLC is not used. When all threads (that is, cores) in the cluster are in the suspend or offline state, the AND gate 182 output the all core suspended signal ALL_CORE_SUSPENDED that indicates there is no core that uses the LLC in the cluster.

Figure 10:
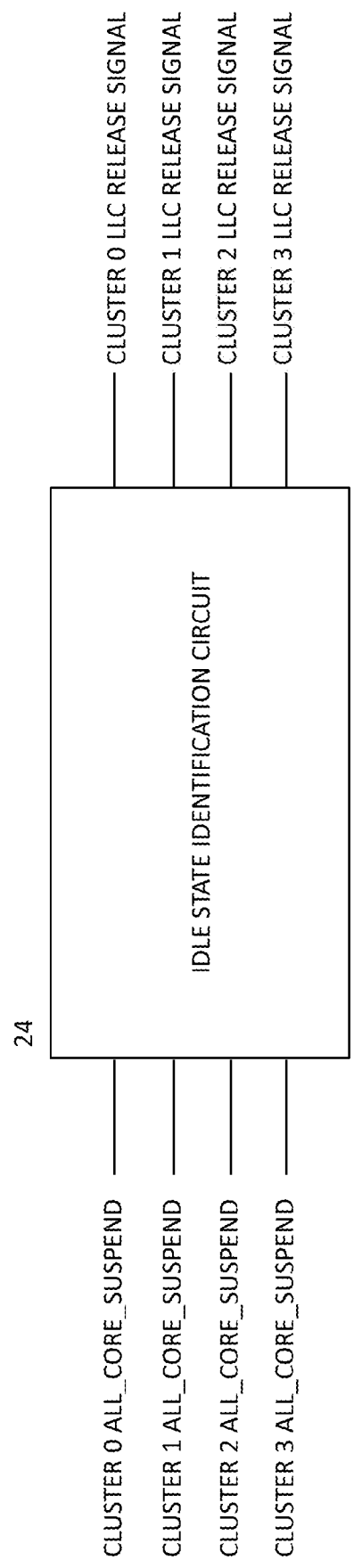
FIG. 10 is a diagram illustrating a schematic configuration of the idle state identification circuit 24.

FIG. 10 is a diagram illustrating a schematic configuration of the idle state identification circuit 24. The idle state identification circuit 24 receives the all-core suspend signals ALL_CORE_SUSPEND of the respective clusters, checks the ratio of the suspend state and the duration of the idle state of the respective clusters, and outputs LLC release signals for the clusters.

Figure 11:
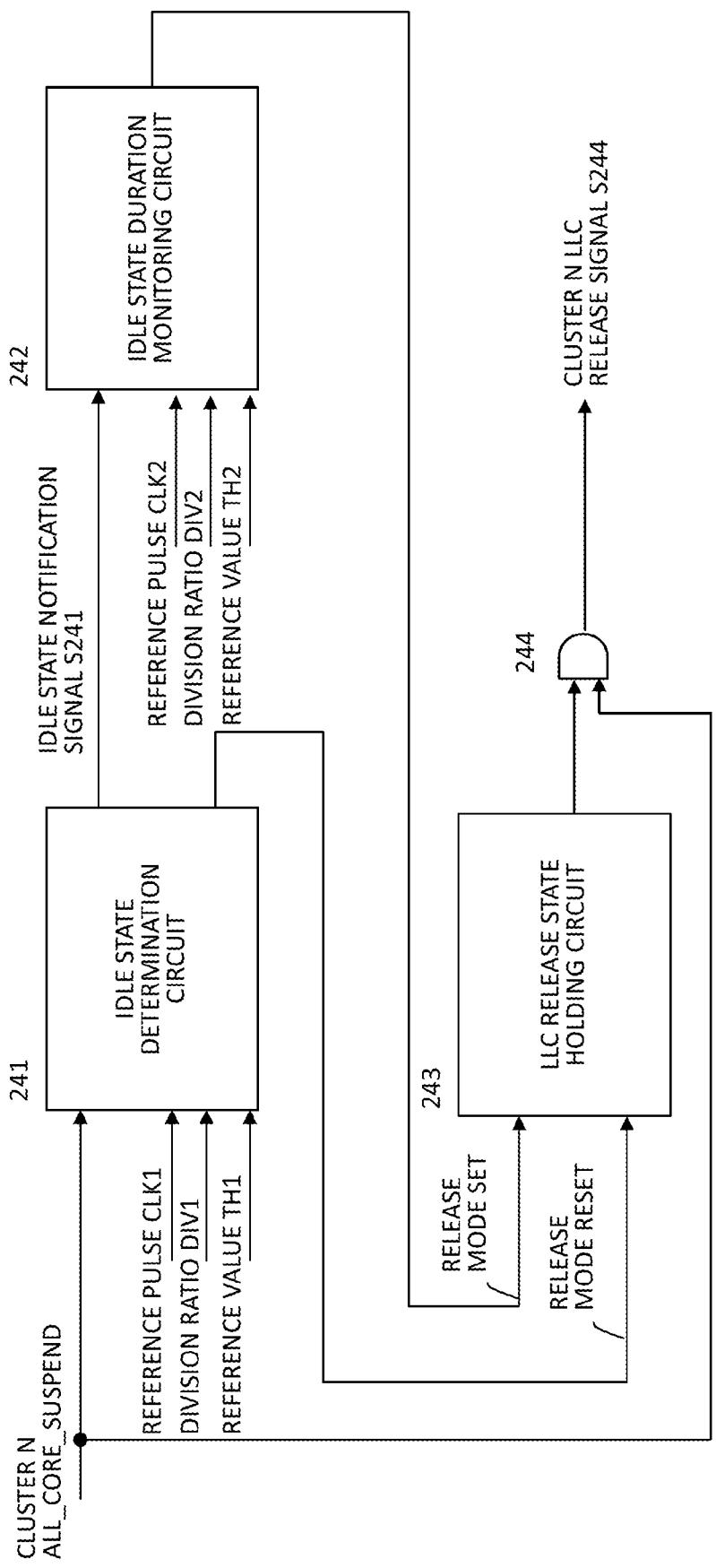
FIG. 11 is a diagram illustrating a configuration of an idle state identification circuit that detects an idle state of a certain cluster N.

FIG. 11 is a diagram illustrating a configuration of an idle state identification circuit that detects an idle state of a certain cluster N. The idle state identification circuit 24 in FIG. 10 includes the circuit illustrated in FIG. 11 for all clusters. The idle state identification circuit illustrated in FIG. 11 includes an idle state determination circuit 241, an idle state duration monitoring circuit 242, and an LLC release state holding circuit 243.

The idle state determination circuit 241 determines that all cores belonging to the cluster N are in the idle state when the ratio of the state "1" and "0" of the all-core suspend signal ALL_CORE_SUSPEND is equal to or greater than a predetermined ratio. The state "1" and "0" of the all-core suspend signal ALL_CORE_SUSPEND means that all cores in the cluster are SUSPEND or OFFLINE at that time only. Thus, the idle state determination circuit 241 sets an idle state notification signal S241 to "1" when a number obtained by subtracting the number of times the all-core suspend signal ALL_CORE_SUSPEND is "0" from the number of times the all-core suspend signal ALL_CORE_SUSPEND is "1" at sampling timing at which a reference pulse CLK1 is divided by a division ratio DIV exceeds a reference value TH1.

For example, the idle state determination circuit 241 includes an up-down counter that is counted up when the state of the all-core suspend signal ALL_CORE_SUSPEND is "1" and is counted down when the state is "0" at the sampling timing. When the count value exceeds the reference value TH1, the idle state notification signal S241 is set to "1" and a release mode reset signal RESET is set to "0." Conversely, when the count value is equal to or smaller than the reference value TH1, the idle state notification signal S241 is set to "0" and the release mode reset signal RESET is set to "1." That is, the idle state notification signal S241 and the release mode reset signal RESET are signals having the opposite polarities. Due to this, the idle state notification signal S241 is set to "1" when the difference between the occurrence frequency of the state "1" of the all-core suspend signal and the occurrence frequency of the state "0" exceeds the reference value TH1. Thus, it is possible to notify a more probable idle state.

Subsequently, the idle state duration monitoring circuit 242 detects that the idle state notification signal S241 continues to be in the state "1" over a predetermined period and sets a release mode set signal SET to "1". However, when the idle state notification signal S241 changes to the state "0," the release mode set signal SET is immediately set to "0."

For example, the idle state duration monitoring circuit 242 includes a counter that counts the number of times the idle state notification signal S241 is in the state "1" at sampling timing at which a reference pulse CLK2 is divided by a division ratio DIV2. When the count value exceeds a reference value TH2, the idle state duration monitoring circuit 242 sets the release mode set signal SET to "1." In contrast, when the idle state notification signal S241 changes to the state "0" even temporarily, the counter resets the count value to "0" so that the release mode set signal SET is set to "0".

When the idle state duration monitoring circuit 242 is provided, it is possible to reliably check that a core in the cluster N is not using a cache and to prevent the occurrence of a situation in which, when a certain cluster returns from a short sleep state, an LLC which was in the short sleep state has been used by another cluster.

The LLC release state holding circuit 243 is an RS flip-flop which is set when the release mode set signal SET is changed to "1", is reset when the release mode reset signal RESET is changed to "1", and outputs the state of the RS flip-flop as an LLC release signal S244 via an AND gate 244. When the idle state duration monitoring circuit 242 sets the release mode set signal SET to "1," the output of the LLC release state holding circuit 243 is set to "1." On the other hand, the release mode reset signal RESET is a signal having the opposite polarity from the idle state notification signal S241. Even when a value obtained by subtracting the number of times the all-core suspend signal ALL_CORE_SUSPEND is "0" from the number of times the all-core suspend signal ALL_CORE_SUSPEND is "1" is equal to or smaller than the reference value TH1 even temporarily, the release mode reset signal RESET is set to "1" and the output of the LLC release state holding circuit 243 is reset to "0".

Further, when the all-core suspend signal ALL_CORE_SUSPEND is in the state "1", the LLC release state holding circuit 243 outputs the LLC release signal S244 as it is due to the AND gate 244. However, if the all-core suspend signal ALL_CORE_SUSPEND changes to the state "0" even temporarily, the LLC release signal S244 changes to the state "0" immediately following the change. When the all-core suspend signal ALL_CORE_SUSPEND continues to be in the state "0", the count value of the counter of the idle state determination circuit 241 decreases gradually to be smaller than the reference value TH1. Thus, the output of the LLC release state holding circuit 243 will be reset and the LLC release signal S244 will maintain the state "0." In contrast, when the all-core suspend signal ALL_CORE_SUSPEND returns to "1" immediately, since the LLC release state holding circuit 243 is in the set state, the LLC release signal S244 returns to the state "1" immediately when the all-core suspend signal ALL_CORE_SUSPEND changes to "1". Due to this structure, when a core in a cluster really returns from a suspend state, the LLC release signal S244 is immediately returned to "0." When the SUSPEND state is cleared for a short period for the timer processing or the like by a system software such as OS, the LLC release signal S244 is set to "0" just temporarily. In this way, it is possible to minimize the influence on the LLC release operation, due to the clearing of the SUSPEND state for a short period. Specific examples of the respective circuits in FIG. 11 will be omitted.

[Four Embodiments] Next, the control in which the home agent HA fills a victim line to an LLC in an idle cluster will be described with reference to four examples of the present embodiment.

Figure 12:
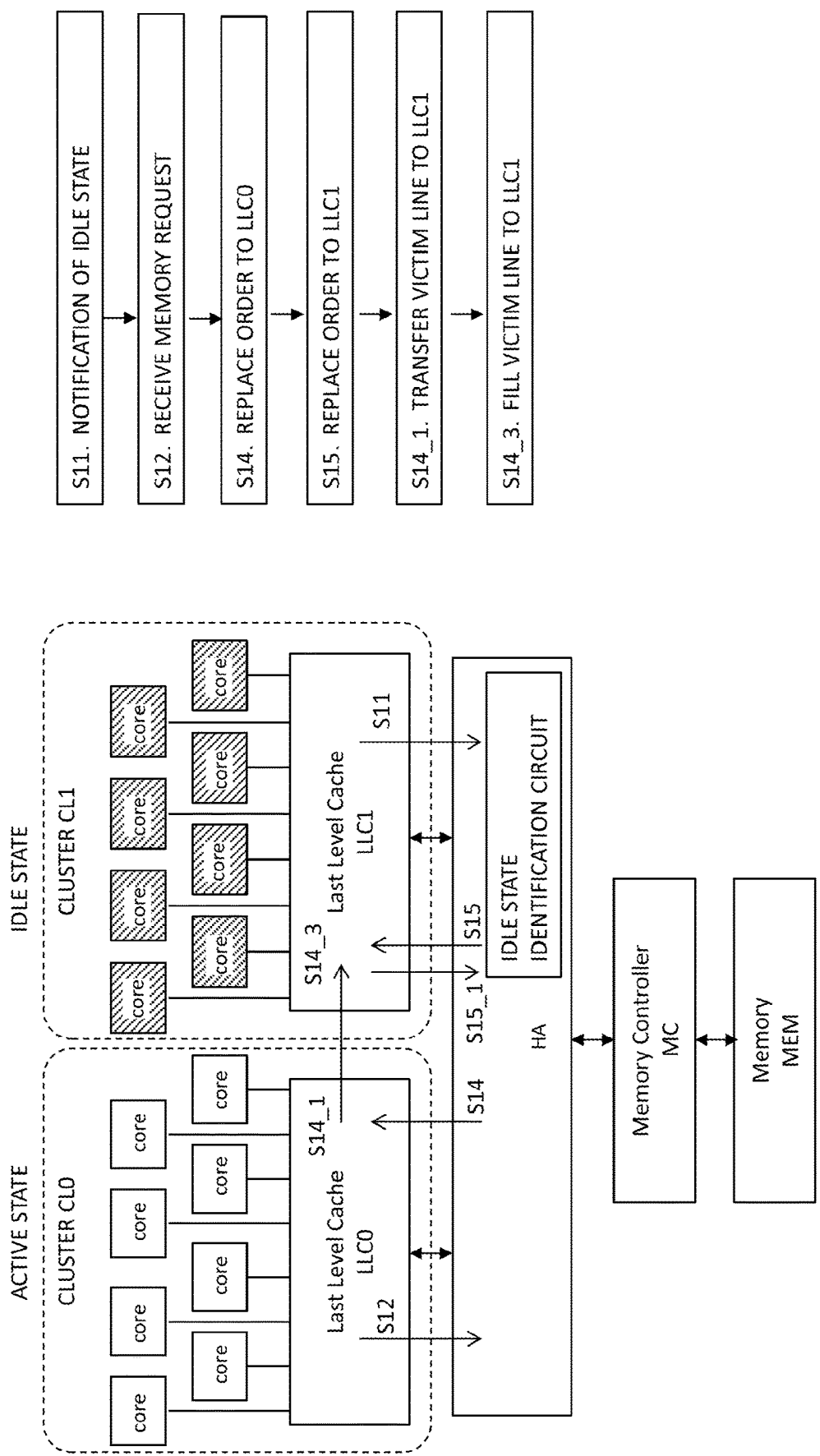
FIG. 12 is a diagram illustrating an outline of the operations of the home agent in response to a memory request according to the present embodiment.

FIG. 12 is a diagram illustrating an outline of the operations of the home agent in response to a memory request according to the present embodiment. As a premise, it is assumed that the processor includes two clusters CL0 and CL1, the home agent HA, and the memory controller MC, and the cluster CL0 is in an active state and the cluster CL1 is in an idle state. The operations common to the four examples of the embodiment will be described below.

First, the home agent HA receives an LLC release signal S244 from an internal idle state identification circuit, indicating that the cluster CL1 is in the idle state (S11). In this state, the home agent HA receives a memory request from the LLC0 of the cluster CL0 (S12).

The home agent HA searches all LLC tag copies based on the address of the memory request, determines a victim line in the LLC0, and execute the following control so that the victim line is transferred to the LLC1 of the cluster CL1 in the idle state. Firstly, the home agent HA issues a replace order to the LLC0 to request removal (eviction) of the victim line (S14). Secondly, the home agent HA issues a replace order to the LLC1 in the release state to request removal (eviction) of a cache line in the LLC1 for filling (registering) the victim line of the LLC0 (S15). Moreover, the home agent HA performs control in various methods so that the victim line of the LLC0 is transferred to the LLC1 (S14_1). Finally, the LLC1 fills (registers) the victim line of the LLC0 to the removed cache line in the LLC1 (S14_3).

The control of transferring the victim line of the LLC0 to the LLC1 involves for example (1) issuing a transfer-and-replace order to the LLC0 as a replace order to request the LLC0 to remove the victim line and transfer the victim line to the LLC1. For example, (2) having the LLC1 issue a memory request to fetch the data of the address of the victim line of the LLC0 from the memory, having the LLC1 acquire the data removed from the LLC0 and written back to the memory, and having the LLC1 fill the data to the cache line removed from the LLC1. The other methods may be used as explained later.

As described above, in the present embodiment, in response to a memory request from the LLC0, the home agent HA issues orders to the LLC0 and LLC1 autonomously to perform control so that the victim line of the LLC0 is transferred to the LLC1.

Figure 13:
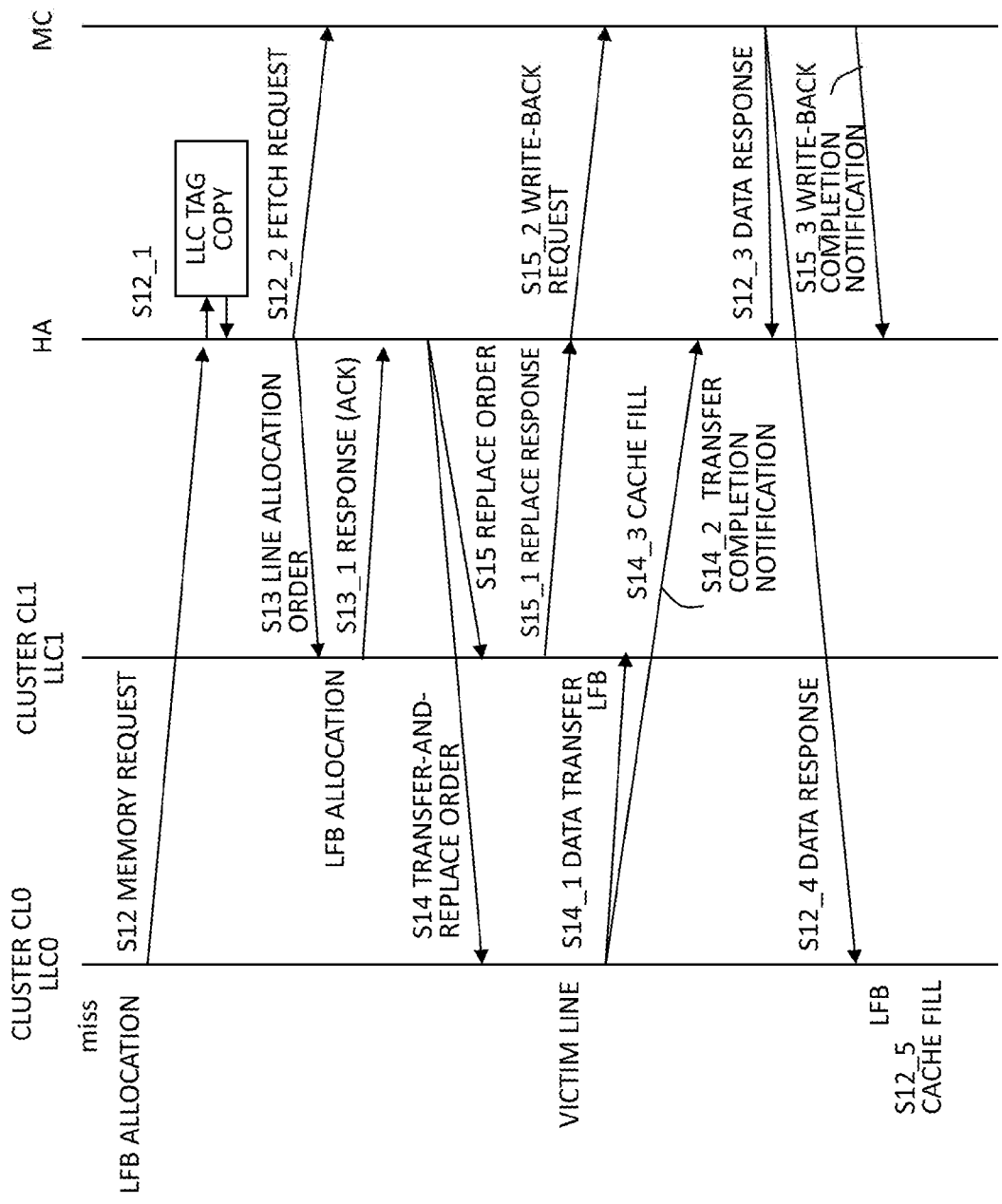
FIG. 13 is a diagram illustrating the operation sequence within a processor according to a first embodiment.
Figure 14:
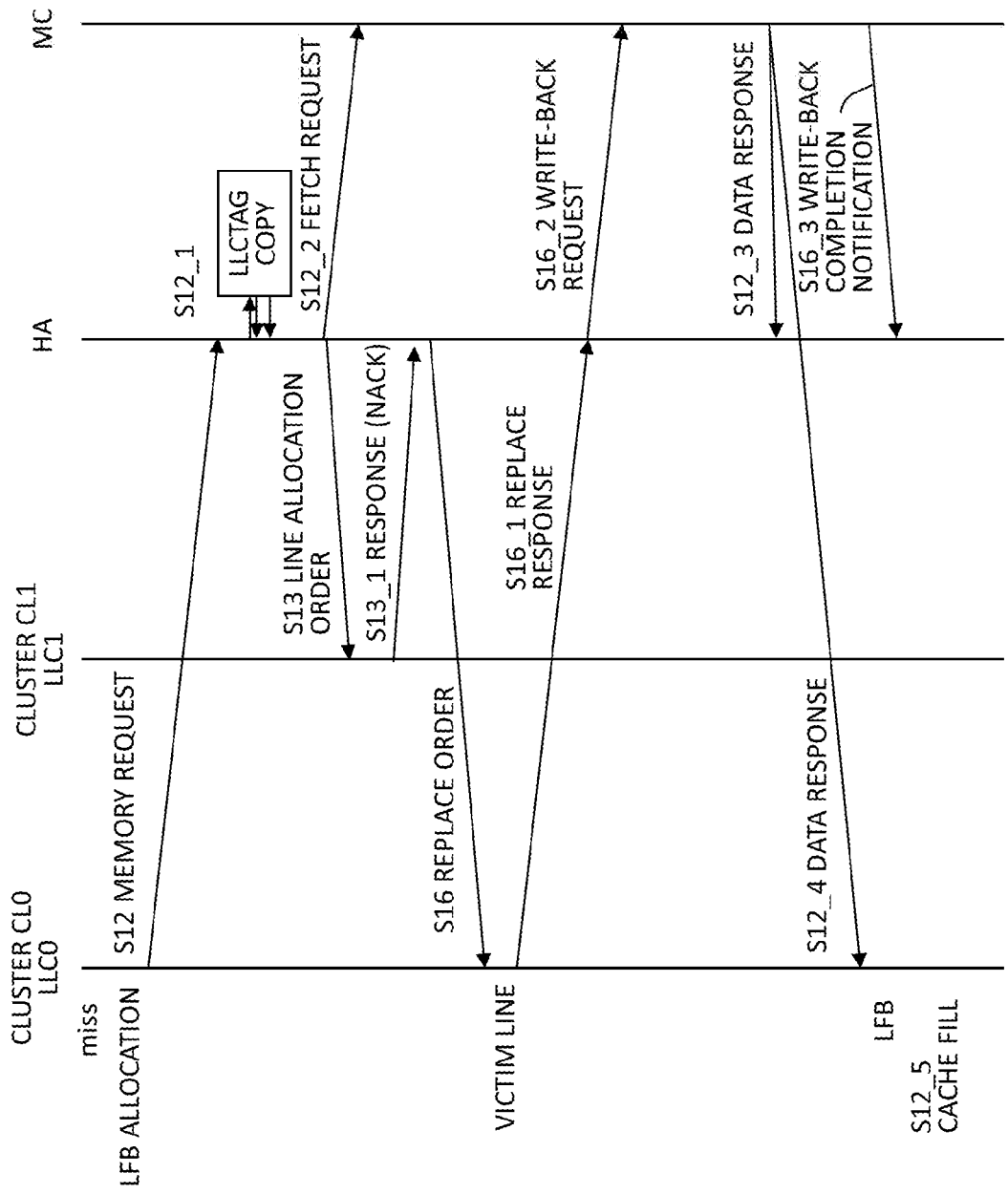
FIG. 14 is a diagram illustrating the operation sequence within a processor according to a first embodiment.

[First Embodiment] FIGS. 13 and 14 are diagrams illustrating the operation sequence within a processor according to a first embodiment. In the first embodiment, the home agent HA issues a transfer-and-replace order as a replace order to the LLC0. Further, the home agent HA issues a line allocation order to request allocation of a line fill buffer to the LLC1.

Although not illustrated in FIG. 13, the home agent HA is already notified of information indicating which cluster is in the idle state (the LLC release state) from the idle state identification circuit.

Subsequently, a certain core in the cluster CL0 issues a memory request to the LLC0, a cache miss occurs in the LLC0, and a memory request is issued to the HA pipeline of the home agent (S12). In response to the memory request, the HA pipeline searches LLC tag copies based on the address of the memory request and detects that the LLC1 does not have the data of the address when a cache miss occurs (S12_1). Thus, the HA pipeline issues a fetch request to the memory controller MC using the address of the memory request (S12_2) and performs control so that data is read from the memory. In this case, the HA pipeline detects an index number (or an address) of the victim line of the LLC0 from the LLC tag copies.

Subsequently, since the HA pipeline is notified of the fact that the cluster CL1 is in the idle state and the LLC1 is in the release state, the HA pipeline issues a line allocation order to the LLC1 (S13) to request allocation of a buffer in the line fill buffer LFB to the LLC1 before issuing as normally a replace order to the LLC0 which is the source of the memory request. In response to this, the LLC pipeline of the LLC1 sends a line allocation response having ACK indicating completion of allocation to the HA pipeline (S13_1) when the LLC pipeline succeeds in allocation of the line fill buffer. When allocating the line fill buffer, the LLC pipeline of the LLC1 detects a way number of a cache line in the LLC1 in which the victim line of the LLC0 is to be filled and allocates the line fill buffer corresponding to the address.

The HA pipeline waits for this response and issues a transfer-and-replace order to the LLC0 (S14) to perform control so that the LLC pipeline of the LLC0 removes the victim line and transfers the victim line to the LLC1 of the cluster CL1.

At the same time, the HA pipeline issues a replace order to the LLC1 (S15) to perform control so that the LLC1 removes a cache line (second victim line) in which the victim line of the LLC0 is to be filled. In response to this, the LLC pipeline of the LLC1 sends a replace response that the second victim line is removed (S15_1). Moreover, when the removed data is dirty, the HA pipeline issues a write-back request to the memory controller (S15_2) so that the data is written back to the memory.

On the other hand, in response to the transfer-and-replace order S14, the LLC0 removes the victim line of the LLC0 and transfers the data of the victim line of the LLC0 to the LLC1 (S14_1). The index or the address of the victim line is included in the transfer-and-replace order. Moreover, the line fill buffer LFB of the LLC1 temporarily stores the transferred data of the victim line to the allocated line fill buffer LFB, and the LLC pipeline of the LLC1 fills (registers) the data of the victim line of the LLC0 to the second victim line of the LLC1 (S14_3). Moreover, the LLC0 sends a transfer completion notification (transfer-and-replace response) for the transfer-and-replace order to the home agent (S14_2).

After that, the memory controller sends a data response to the fetch request S12_2 to the HA pipeline and the LLC pipeline of the LLC0 (S12_3 and S12_4). The LLC0 of the cluster CL0 temporarily stores the data of the data response in the line fill buffer of the line fill buffer LFB, and the LLC pipeline fills (registers) the data to the victim line of the LLC0 (S12_5). This line fill buffer LFB is already allocated when the LLC pipeline of the LLC0 first issues the memory request.

In FIG. 14, the LLC pipeline of the LLC1 of the cluster CL1 may sometimes be unable to allocate a line fill buffer in response to the line allocation order S13 since a limited number of buffers are included in the line fill buffer LFB. In this case, the LLC pipeline of the LLC1 sends a line allocation response having NACK meaning allocation failure to the home agent (S13_1).

Since the line allocation response is NACK, the HA pipeline determines that the victim line of the LLC0 is not able to be transferred to the LLC1 and issues a replace order to the LLC0 (S16) so that the LLC0 removes the victim line. In response to this, the LLC0 sends a replace response having the data of the victim line to the HA pipeline (S16_1). When the data is dirty, the HA pipeline issues a write-back request to the memory controller (S16_2).

After that, the memory controller sends the data response to the fetch request 512_2 to the HA pipeline and the LLC0 (S12_3 and S12_4) and the LLC0 fills (registers) the read data to the victim line. This operation is the same as that of FIG. 13.

As described above, in the first embodiment, the home agent issues a transfer-and-replace order to the LLC0 which is the source of the memory request to cause the LLC0 to remove a victim line and transfer the data of the victim line to the LLC1 of the cluster CL1 in the idle state. Further, the home agent issues a line allocation order to the LLC1 prior to the transfer-and-replace order so that a line fill buffer is allocated in the LLC1. In this way, the LLC1 stores the transferred data of the victim line in the allocated line fill buffer and fills (registers) the data in the cache memory of the LLC1.

Figure 15:
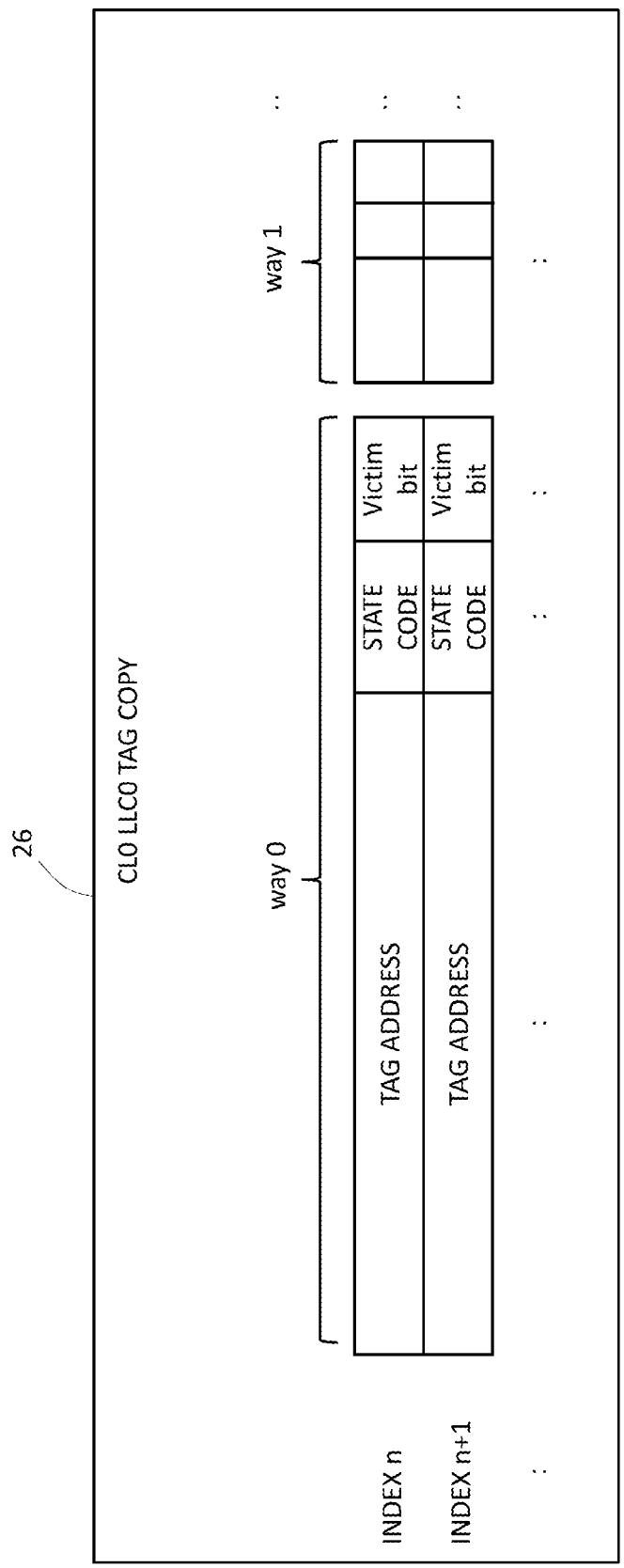
FIG. 15 is a diagram illustrating LLC tag copies held by the home agent.

[Details of First Embodiment] FIG. 15 is a diagram illustrating LLC tag copies held by the home agent. In FIG. 15, the tag copy of the LLC0 of the cluster CL0 is illustrated as an example. The LLC tag copy stores a tag address and a state code in correspondence to an index in each of a plurality of ways Way. The tag address corresponds to the address of data in a corresponding cache data memory. The state code is the MESI code.

The LLC tag copy may store a victim bit. The victim bit is a state bit indicating that the corresponding cache line is a cache line of the LLC1 in which the data of the victim line of the LLC0 has been filled in response to the transfer-and-replace order. For example, when a cache line having the victim bit of "1" becomes a victim line later, further transfer of data of the cache line to the LLC of other idle clusters is inhibited.

Figure 16:
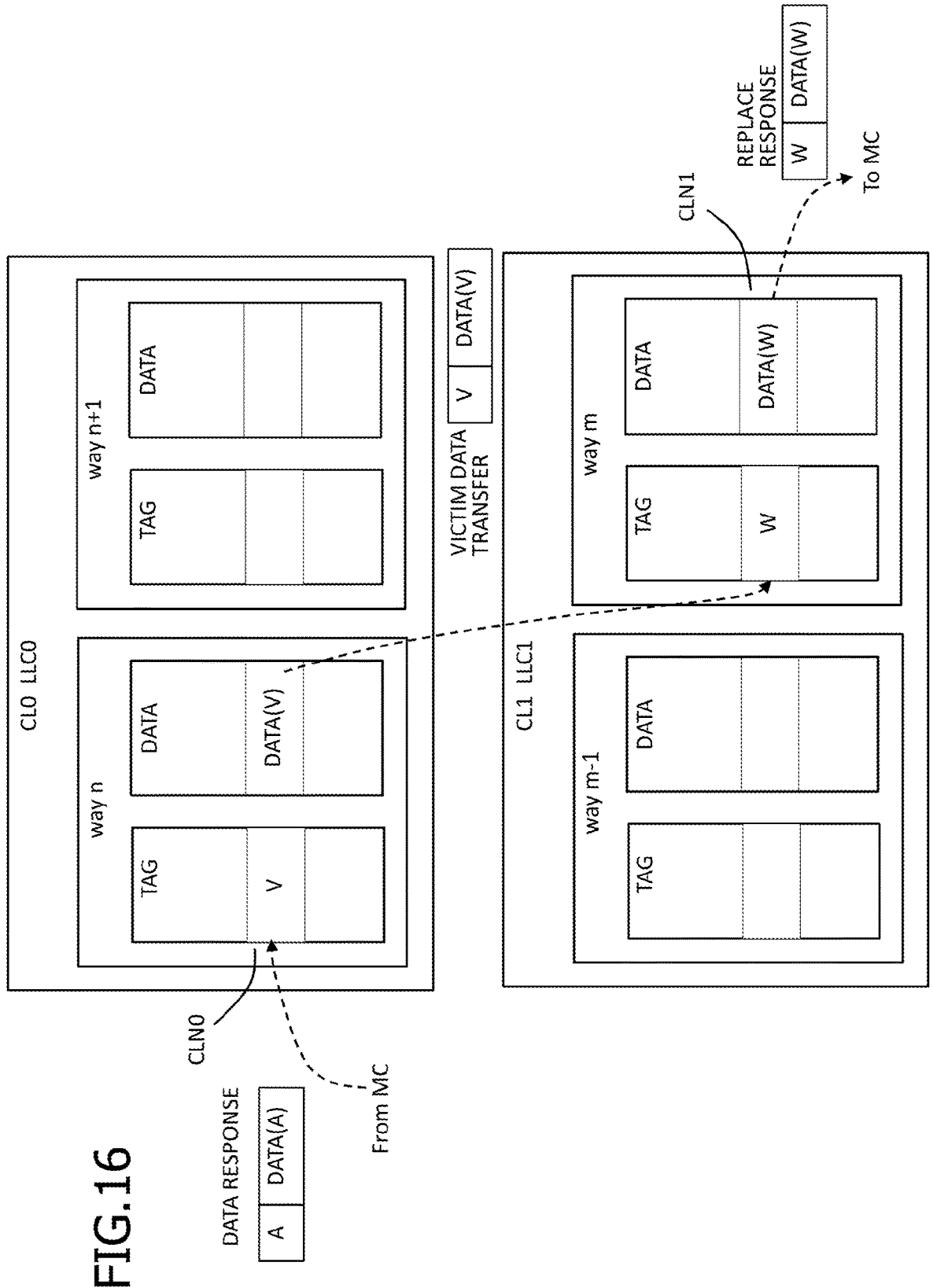
FIG. 16 is a diagram illustrating an example of a cache tag memory and a cache data memory of the LLC0 and LLC1 according to the first embodiment.

FIG. 16 is a diagram illustrating an example of a cache tag memory and a cache data memory of the LLC0 and LLC1 according to the first embodiment. In the example of FIG. 16, a victim line CLN0 of the LLC0 that issued a memory request is indicated by (way n, address (V), data DATA (V)) and a cache line CLN1 of the LLC1 in which the data of the victim line of the LLC0 is filled is indicated by (way m, address (W), data DATA (W)). Hereinafter, the victim lines will be referred to as a first victim line CLN0 and a second victim line CLN1.

As described above, the second victim line CLN1 of the LLC1 is removed according to a replace order and written back to memory, the data of the first victim line CLN0 of the LLC0 is transferred and filled to the cache line CLN1 of the LLC1, and data (address (A), data DATA (A)) of the data response from the memory controller is filled to the first victim line CLN0 of the LLC0. The way numbers of the two victim lines CLN0 and CLN1 are different, but the cache indexes thereof are identical. That is, the lower bits of the address (A) of the memory request, the address (V) of the first victim line CLN0, and the address (W) of the second victim line CLN1 in which the first victim line is registered are the same. Thus, the addresses are stored in a cache line of the same cache index.

Figure 17:
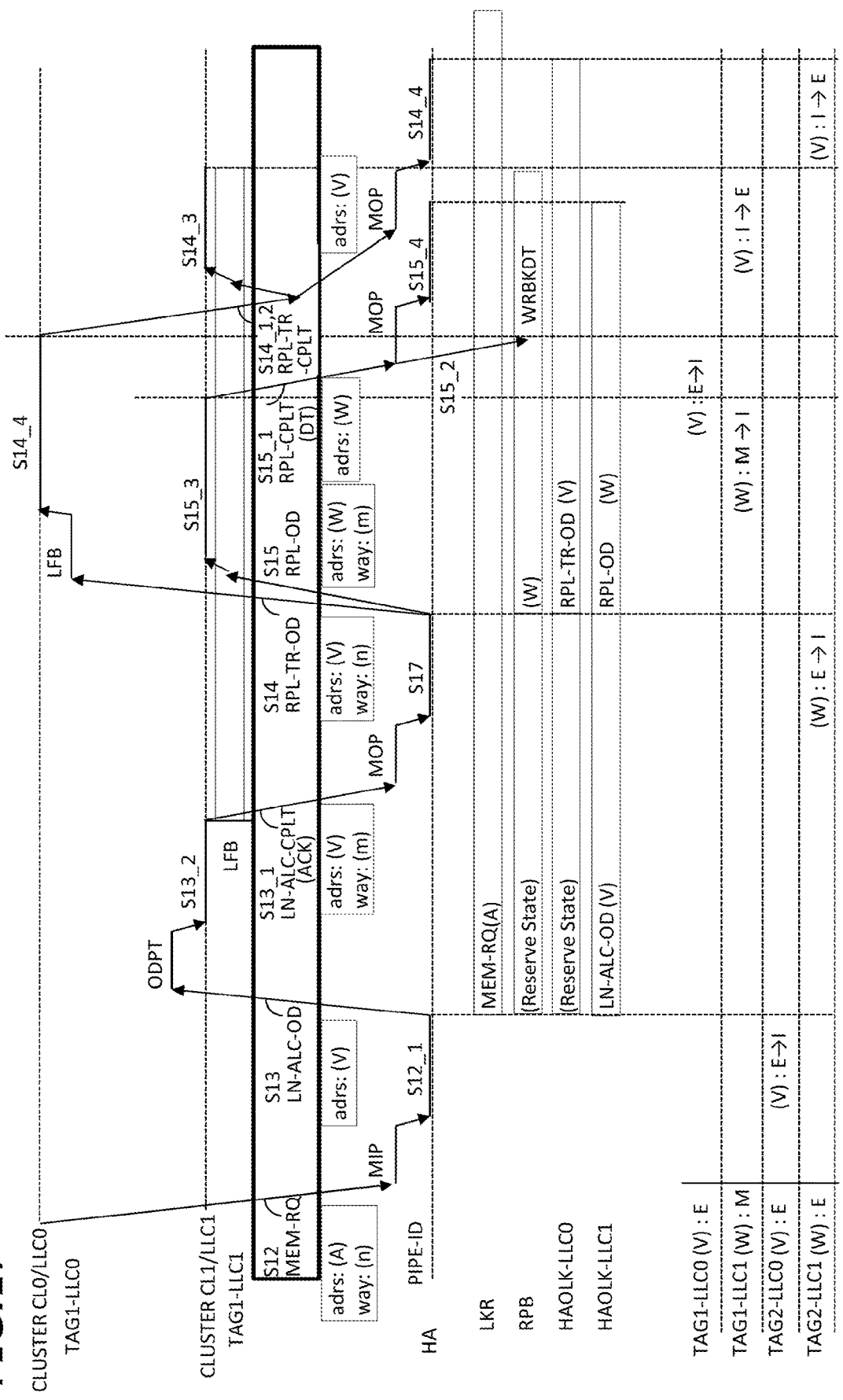
FIG. 17 is a diagram illustrating the operation sequence within the processor according to the first embodiment.

FIG. 17 is a diagram illustrating the operation sequence within the processor according to the first embodiment. In FIG. 17, the LLC0 of the cluster CL0 holds an LLC tag TAG1-LLC0 and the LLC1 of the cluster CL1 holds an LLC tag TAG1-LLC1. Moreover, the HA pipeline holds the LLC tag copies TAG2-LLC0 and TAG2-LLC1. The state code of the tag TAG1-LLC1 of the LLC1 only is set to M (Modified). In FIG. 17, the addresses and way numbers of each request and order are illustrated based on the example of FIG. 16, and the operation of FIG. 13 is described while describing the tag state codes and the circuit resources MIP, MOP, LKR, RPB and HAOLK of the HA pipeline of the home agent HA.

In response to a request for the data of the address (A) issued by the core of the cluster CL0, when a cache miss occurs in the LLC pipeline of the LLC0, the LLC pipeline issues a memory request MEM-RQ to the HA pipeline (S12). The memory request MEM-RQ includes the way (n) of a cache destination in the LLC0 and the address (A) of the memory.

In response to the memory request input via the move-in port MIP, the HA pipeline searches the LLC tag copies TAG2-LLC0 and TAG2-LLC1 and detects that the address (A) is not held by any other clusters and that the address (V) is registered in the first victim line in the LLC0 in the E-state (S12_1).

Thus, when the address (A) is the memory of the host CPU, the HA pipeline acquires the lock of the lock register LKR and issues a fetch request to the memory controller MC (S12_2 in FIG. 13). In general, in this flow, the HA pipeline issues the replace order RPL-OD to the LLC0 of the cluster CL0. However, in the present embodiment, when the cluster CL1 is in the idle state, the HA pipeline issues a line allocation order LN-ALC-OD (including the address (V) of the first victim line) to the cluster CL1 (S13). The line allocation order LN-ALC-OD is an order that requests the line fill buffer LFB to secure a line fill buffer used for transferring the first victim line to the LLC1 in the idle state. In this flow, the HA pipeline registers the request for the address (A) to the lock register LKR and reserves a replace buffer RPB and an order lock circuit HAOLK-LLC0 of the home agent, which are likely to be used later. Since the order is issued to the cluster CL1, the address (V) is registered to the lock circuit HAOLK-LLC1.

The line allocation order LN-ALC-OD flows along the LLC pipeline of the LLC1 of the cluster CL1 via the order port ODP of the cluster CL1 (S13_2). The LLC pipeline of the LLC1 searches LLC tags, and issues a line allocation response LN-ALC-CPLT (with the ACK flag) to the HA pipeline when a cache miss occurs in the address (A), the LLC1 does not hold data and a line fill buffer can be allocated. Since the line allocation order LN-ALC-OD is in the state of holding the order resource (HAOLK-LLC1), when a buffer can be allocated, the LLC1 sends ACK as a response. When a buffer is not able to be allocated or when a cache hit occurs and the first victim line does not need to be transferred from the LLC0, the LLC1 sends NACK as a response.

When a buffer can be allocated, the LLC1 determines which cache way in the LLC1 is to be replaced in this flow S13_2. In this case, the determined way in the LLC1 is set to way=m (see FIG. 16). Since there is a possibility that another data is registered in the cache line CLN1 of way=m in the LLC1, replacement is also needed. That is, the second victim line (W) CLN1 of the LLC1 of the cluster CL1, which is removed by the transfer of the first victim line (V) CLN0 of the LLC0 of the cluster CL0, is present.

The line allocation response LN-ALC-CPLT (in the case of ACK) includes an address (V) and a way (m). This line allocation response is input (submitted) to the HA pipeline via the move-out port MOP. In response to this, the HA pipeline understands whether a line fill buffer can be allocated in the LLC1 of the cluster CL1 (S17). Moreover, the HA pipeline understands that the address (W) is stored in the second victim line CLN1 in the way (m) of the LLC1.

Thus, the HA pipeline issues the transfer-and-replace order RPL-TR-OD to the LLC0 of the cluster CL0 (S14) so that the first victim line CLN0 of the address (V) in the way (n) is transferred to the LLC1 of the cluster CL1. At the same time, the HA pipeline issues a replace order RPL-OD to the LLC1 of the cluster CL1 (S15) so that the second victim line CLN1 of the address (W) in the way (m) of the LLC1 is removed to empty the space for transferring the first victim line (V) CLN0 in the LLC0.

With these orders, the HA pipeline uses the reserved resources HAOLK-LLC0, HAOLK-LLC1, and RPB. As for HAOLK-LLC1, the order resource is locked using another address (W) simultaneously with release of LN-ALC-OD (V). That is, HAOLK-LLC0 locks RPL-TR-OD using the address (V) and HAOLK-LLC1 locks RPL-OD using the address (W). As illustrated in the drawing, when the status of the address (W) is (M) (that is, dirty), write-back to the memory is needed. Thus, the reserved replace buffer RPB is used here.

In response to the replace order RPL-OD, the LLC1 of the cluster CL1 performs a replace process on the second victim line CLN1 (S15_3) and transfers the dirty data (DT) to the replace buffer RPB of the home agent HA together with the replace response RPL-CPLT (S15_1). The dirty data is stored in the RPB in HA (S15_2) for a write back data (WRBKDT).

On the other hand, the LLC pipeline of the LLC0 of the cluster CL0 having received the transfer-and-replace order RPL-TR-OD transfers the first victim line CLN0 of the address (V) to the line fill buffer LFB of the LLC1 of the cluster CL1 (S14_1). At the same time, the LLC pipeline sends the replace response RPL-TR-CPLT to the home agent HA as a response (S14-2). The HA pipeline having received the replace response via the MOP releases HAOLK-LLC0 and registers the address (V) to the LLC tag copy portion with a victim bit attached (S14_4). The victim bit is flag information for preventing a cache line from being transferred again to another cluster in the idle state when the cache line becomes a replacement target.

Although not illustrated in FIG. 17, after that, the lock register LKR is released when a data response to a fetch request issued to the memory is returned, and a data response is transferred to the line fill buffer LFB of the cluster CL0 which is the source of the memory request.

Figure 18:
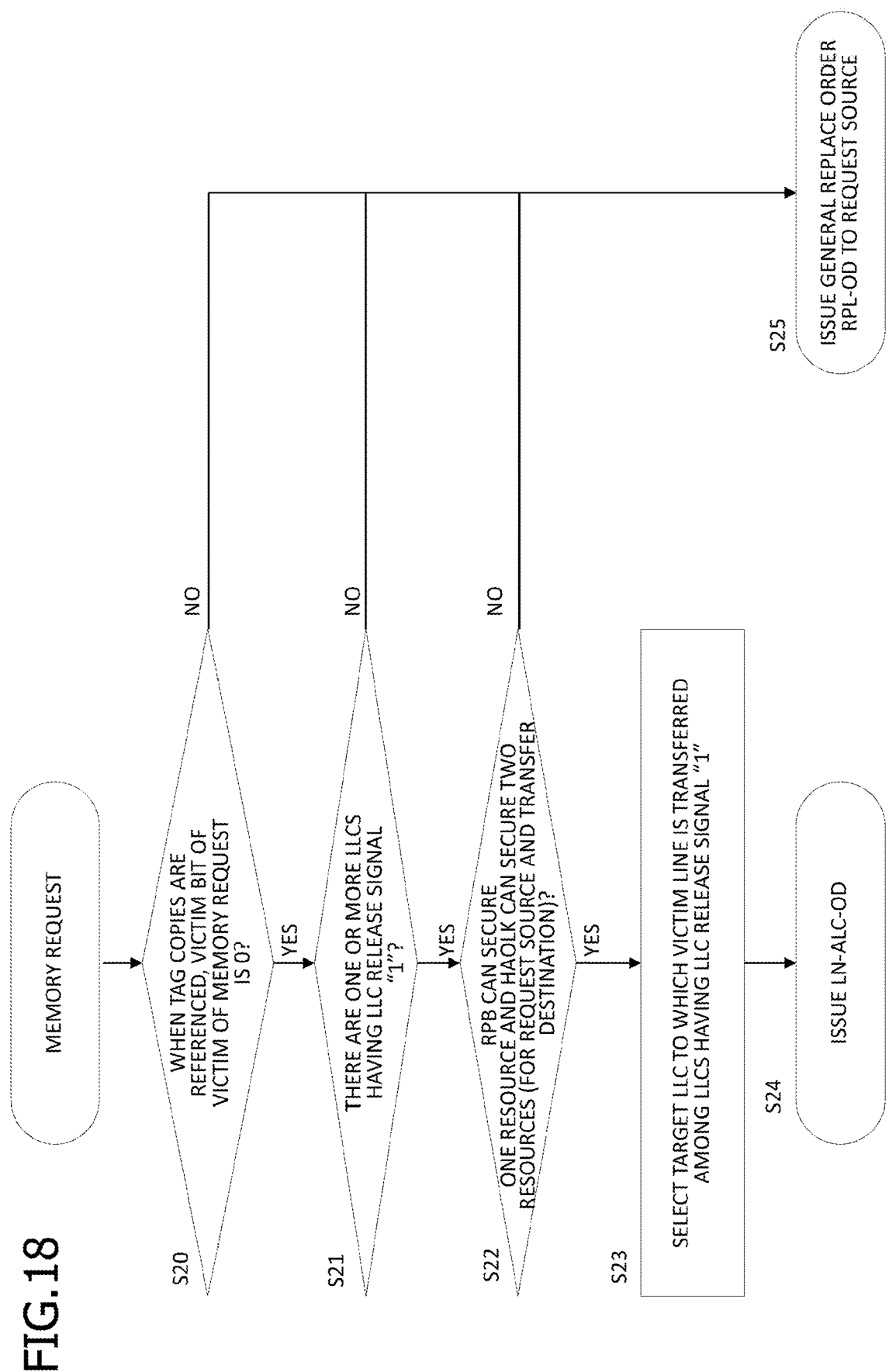
FIG. 18 is a flowchart illustrating the conditions on which the HA pipeline having received a memory request issues the line allocation order LN-ALC-OD.

FIG. 18 is a flowchart illustrating the conditions on which the HA pipeline having received a memory request issues the line allocation order LN-ALC-OD. The HA pipeline issues the line allocation order LN-ALC-OD when the victim bit of a victim line of the memory request is "0" (S20: YES), when there are one or more LLCs in which the LLC release signal (S244 in FIG. 11) is "1" (S21: YES), and when the replace buffer RPB can secure one hardware resource and the order lock circuit HAOLK can secure two hardware resources for request source and transfer destination (S22: YES) by referring to the LLC tag copies. In this case, the HA pipeline selects a target LLC to which the victim line is to be transferred among LLCs in which the LLC release signal is "1" according to a predetermined algorithm (S23). The algorithm may select the LLC according to a random method, a round-robin method, or a least-recently used (LRU) method, for example. When any one of the conditions is not satisfied, the HA pipeline does not transfer the victim line but issues a general replace order RPL-OD to the LLC0 that issued the memory request.

Figure 19:
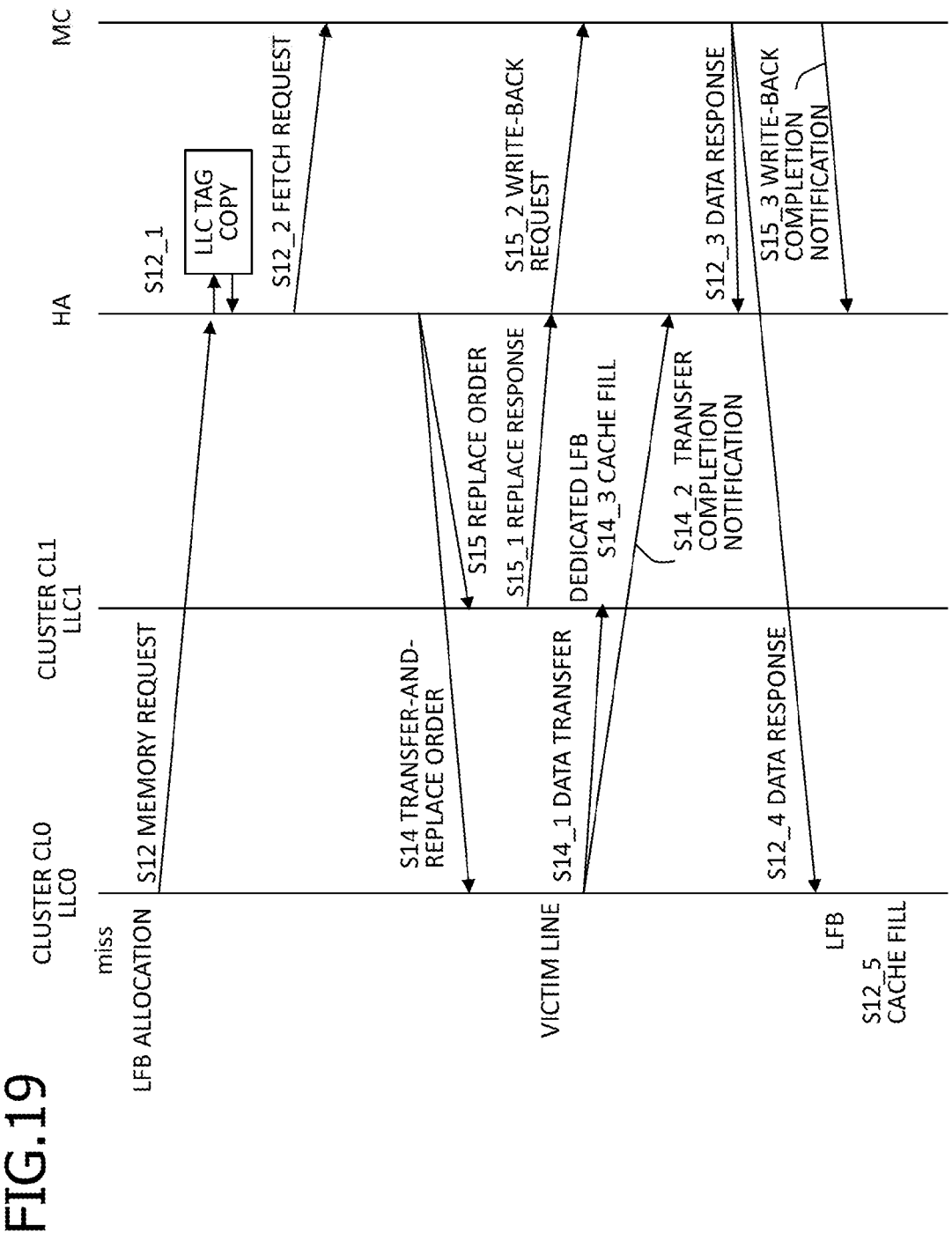
FIG. 19 is a diagram illustrating the operation sequence within a processor according to a second embodiment.

[Second Embodiment] FIG. 19 is a diagram illustrating the operation sequence within a processor according to a second embodiment. In the second embodiment, the LLC0 and LLC1 each includes a dedicated line fill buffer (victim line buffer) that receives a victim line to be transferred. Thus, the HA pipeline does not issue the line allocation order that requests the LLC1 to allocate a line fill buffer unlike the first embodiment. Moreover, the HA pipeline issues the transfer-and-replace order RPL-TR-OD to the LLC0 as the replace order similarly to the first embodiment (S14). In response to this order, the LLC0 transfers the first victim line to the LLC1 (S14_1) and the LLC1 receives the data of the transferred first victim line using a dedicated line fill buffer (victim line buffer) and fills the data to the second victim line (S14_3). The other operations are the same as those of the first embodiment.

Figure 20:
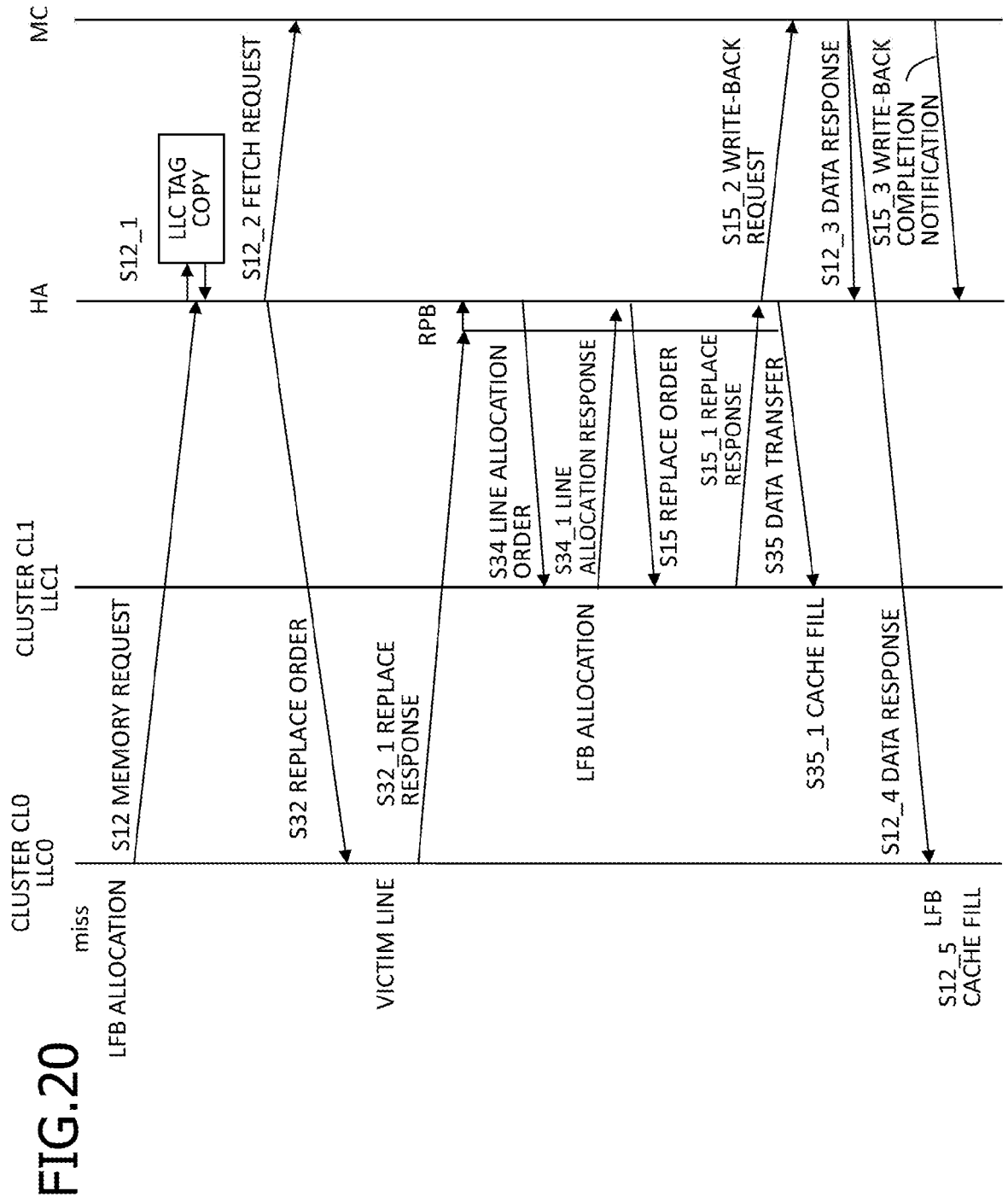
FIG. 20 is a diagram illustrating the operation sequence within a processor according to a third embodiment.

[Third Embodiment] FIG. 20 is a diagram illustrating the operation sequence within a processor according to a third embodiment. In the third embodiment, the HA pipeline issues a replace order to the first victim line of the LLC0 (S32). In response to this, the LLC0 sends a replace response to the HA pipeline as a response (S32_1). The home agent HA stores the data of the first victim line sent as the replace response to the replace buffer RPB.

After that, the HA pipeline issues a line allocation order to the LLC1 (S34) to request the LLC1 to allocate a line fill buffer for receiving the data of the first victim line. In response to this, the LLC1 allocates the line fill buffer and sends a line allocation response to the home agent HA as a response (S34_1).

After that, the HA pipeline issues a replace order to the LLC1 (S15) to request the replacement of the second victim line CLN1 in the LLC1 similarly to the first embodiment. The HA pipeline receives a replace response (S15_1).

After that, the HA pipeline issues a data transfer order to the LLC1 together with the data of the replace buffer (S35) and fills data to the LLC1 (S35_1).

The subsequent operations are the same as those of the first embodiment.

Figure 21:
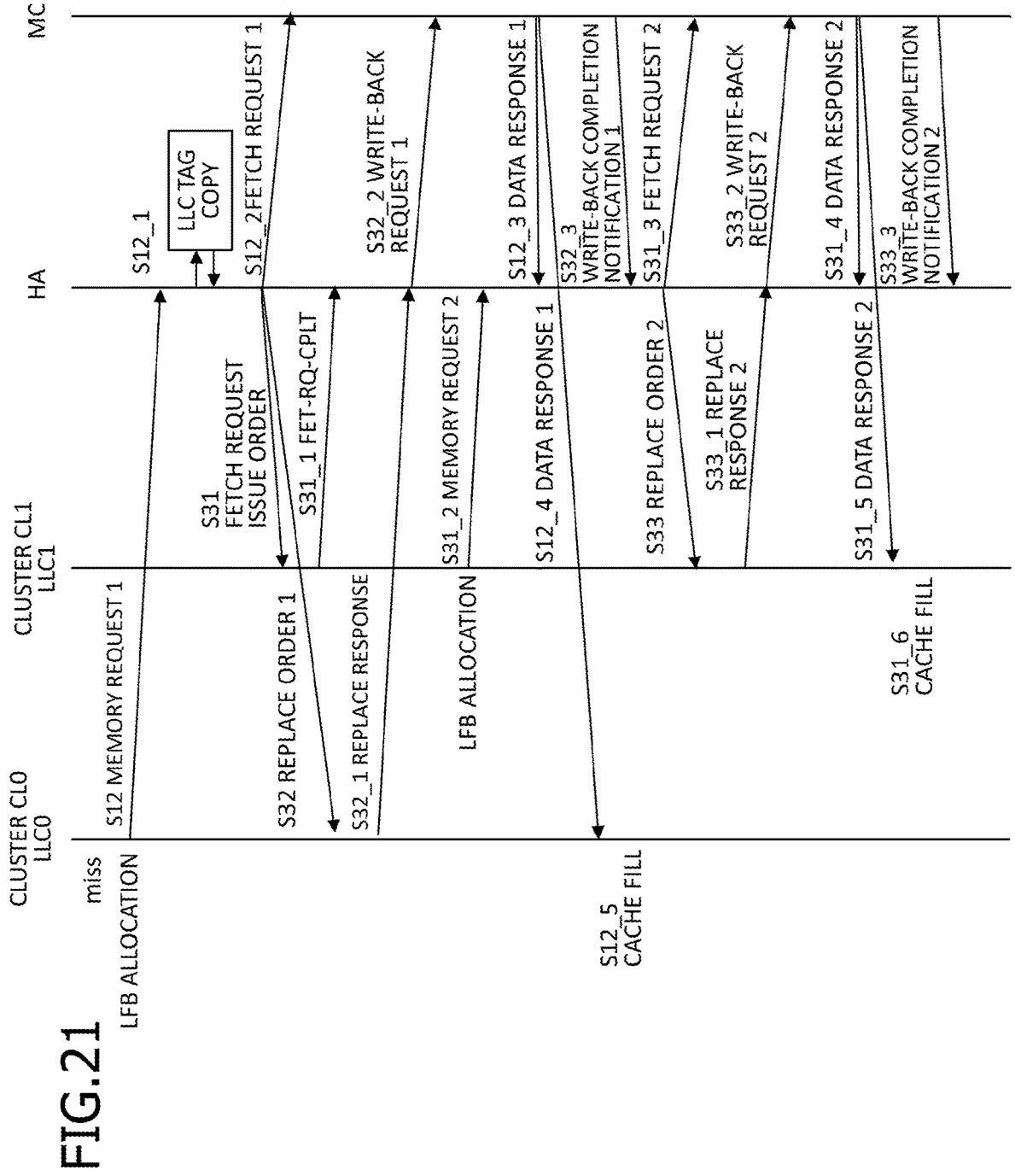
FIG. 21 is a diagram illustrating the operation sequence within a processor according to a fourth embodiment.

[Fourth Embodiment] FIG. 21 is a diagram illustrating the operation sequence within a processor according to a fourth embodiment. The operation of the fourth embodiment will be described briefly. First, the HA pipeline issues a replace order to the first victim line of the LLC0 (S32). In response to this, the LLC0 sends a replace response to the HA pipeline as a response (S32_1). The HA pipeline issues a write-back request to the memory controller MC (S32_2) so that the data of the first victim line of the LLC0 is written back to the memory.

Further, the HA pipeline issues a fetch request issue order to the LLC1 of the cluster CL1 in the idle state (S31) to request the LLC1 to issue a memory request for the address (V) of the first victim line of the LLC0. In response to this, the LLC1 issues a memory request for the address (V) to the home agent HA (S31_2). In this case, the LLC1 allocates the line fill buffer LFB. In response to this, the home agent HA issues a fetch request for the address (V) to the memory controller (S31_3).

The HA pipeline issues a replace order for the second victim line CLN1 to the LLC1 (S33) to request the LLC1 to replace the second victim line CLN1.

After that, the memory controller sends a data response to the fetch request S31_3 (S31_4 and S31_5), and the LLC1 fills the data of the address (V) of the first victim line, sent as the data response (S31_6).

In the fourth embodiment, as described above, as means for transferring the first victim line of the LLC0 to the LLC1, a replace order for the LLC0 and a memory request issue order for the LLC1 by the home agent HA are used. Moreover, the LLC1 issues a memory request for the address (V) of the first victim line, receives the data as a data response, and fills the data in the second victim line. Hereinafter, specific operations will be described.

A cache miss occurs in the cluster CL0, and the cluster CL0 issues a new memory request 1 to the home agent HA (S12). The home agent HA issues a fetch request 1 to the memory controller MC when no LLC holds the requested data by referring to the LLC tag copies (S12_2).

Here, when a cluster in the idle state is present, the home agent HA issues the fetch request issue order FET-RQ-OD to the cluster (S31). In FIG. 21, the cluster CL1 is in the idle state. The fetch request issue order is not a simple line fill buffer allocation order but is an order that requests a fetch request to be issued to the home agent HA. In response to the fetch request issue order, the LLC pipeline of the cluster CL1 generates a new memory request for the address (V) of the victim line of the LLC0 and sets the memory request to the input port (LLC-MIP or LLC-ODP).

The LLC1 sends a response FET-RQ-CPLT to the fetch request issue order to the home agent HA (S31_1). However, this operation is not always needed and can be omitted. For example, when the LLC1 already holds a data of the address (V) delivered with the fetch request issue order S31, this response is NACK, and in this case, a subsequent memory request 2 (S31_2) is not issued. However, the home agent HA can control the number of times the fetch request issue order S31 is issued using the response FET-RQ-CPLT to the fetch request issue order.

The memory request set to the port of the LLC1 flows along the LLC pipeline of the LLC1, a line fill buffer is acquired from the line fill buffer LFB, and a memory request 2 is issued as a new memory request (S31_2). The subsequent operations are the same as those described above.

As described above, in the fourth embodiment, except for the fetch request issue order S31 issued by the home agent HA, general new memory requests are issued from the clusters CL0 and CL1 and general replace orders are issued from the home agent HA to the LLC0 and LLC1 of the clusters CL0 and CL1.

The fourth embodiment can be realized using existing requests and orders.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
a plurality of clusters, each including a plurality of cores and a last level cache shared by the plurality of cores, each core having an arithmetic unit;
a home agent connected to the last level cache included in each of the plurality of clusters; and
a memory controller connected to the home agent to control accesses to a memory, wherein
in response to a memory request supplied from a first last level cache in a first cluster among the plurality of clusters,
the home agent issues a first replace request to the first last level cache to cause the first last level cache to evict a first victim line in the first last level cache,
the home agent issues a second replace request to a second last level cache in a second cluster in an idle state other than the first cluster to cause the second last level cache to evict a second victim line in the second last level cache,
in response to the first replace request, the first last level cache transfers the data of the first victim line to the second last level cache, and
the second last level cache fills the data of the first victim line to the second victim line.

2. The arithmetic processing device according to claim 1, wherein the home agent further issues a line allocation request to the second last level cache to cause the second last level cache to allocate a line fill buffer.

3. The arithmetic processing device according to claim 1, wherein
the last level cache has a victim line buffer in which data of a victim line transferred from another last level cache is stored, and
the second last level cache stores the data of the first victim line transferred by the first last level cache in the victim line buffer and fills the data of the first victim line therein.

4. The arithmetic processing device according to claim 1, wherein the home agent includes an idle state identification circuit that identifies whether the plurality of clusters is in an idle state.

5. The arithmetic processing device according to claim 4, wherein
the idle state identification circuit includes:
an idle state determination circuit that, when the number of times all cores in each of the plurality of clusters are in an offline or suspend state is equal to or greater than a predetermined frequency, determines that the cluster is in the idle state; and
an idle state duration monitoring circuit that, when the idle state continues a predetermined period or longer, determines that the last level cache of the cluster is in a release state.

6. An arithmetic processing device comprising:
a plurality of clusters, each including a plurality of cores and a last level cache shared by the plurality of cores, each core having an arithmetic unit;
a home agent connected to the last level cache included in each of the plurality of clusters and has a replace buffer; and
a memory controller connected to the home agent to control accesses to a memory,
in response to a memory request supplied from a first last level cache in a first cluster among the plurality of clusters,
the home agent issues a first replace request to the first last level cache to cause the first last level cache to evict a first victim line in the first last level cache,
the home agent stores, in the replace buffer, the data of the first victim line evicted from the first last level cache in response to the first replace request,
the home agent issues a second replace request to a second last level cache in a second cluster in an idle state other than the first cluster to cause the second last level cache to evict a second victim line in the second last level cache,
the home agent transfers the data of the first victim line stored in the replace buffer to the second last level cache, and
the second last level cache fills the data of the first victim line to the second victim line.

7. An arithmetic processing device comprising:
a plurality of clusters, each including a plurality of cores and a last level cache shared by the plurality of cores, each core having an arithmetic unit;
a home agent connected to the last level cache included in each of the plurality of clusters; and
a memory controller connected to the home agent to control accesses to a memory,
in response to a first memory request supplied from a first last level cache in a first cluster among the plurality of clusters,
the home agent issues a first replace request to the first last level cache to cause the first last level cache to evict a first victim line in the first last level cache,
the home agent issues a write-back request for data of the first victim line to the memory controller,
the home agent issues a second replace request to a second last level cache in a second cluster in an idle state other than the first cluster to cause the second last level cache to evict a second victim line in the second last level cache,
the home agent further issues an issue request for issuing a second memory request that requests the data of the first victim line to the second last level cache to cause the second last level cache to issue the second memory request to the home agent,
in response to the second memory request sent from the second last level cache, the home agent issues a second fetch request for the data of the first victim line to the memory controller,
the memory controller sends a data response corresponding the second fetch request to the second last level cache, the data response including the data of the first victim line,
the second last level cache receives the data of the first victim line included in the data response, and
the second last level cache fills the data of the first victim line to the second victim line.

* * * * *